United States Patent [19]

Coomer et al.

[11] 3,993,404

[45] Nov. 23, 1976

[54] SELF-THREADING MOTION PICTURE PROJECTOR

[75] Inventors: Roger W. Coomer, Simsbury; Ray L. Marquis, Blookfield; Frank H. Beckman, New Britain, all of Conn.

[73] Assignee: Kalart Victor Corporation, Plainville, Conn.

[22] Filed: Oct. 29, 1974

[21] Appl. No.: 518,780

[52] U.S. Cl. .............................. 352/157; 352/173
[51] Int. Cl.² ........................................ G03B 1/56
[58] Field of Search ............ 352/157, 158, 159, 173

[56] References Cited
UNITED STATES PATENTS

| | | | |
|---|---|---|---|
| 3,734,602 | 5/1973 | Deck | 352/157 |
| 3,743,398 | 7/1973 | Johnson | 352/157 |
| 3,811,760 | 5/1974 | Rube | 352/157 |
| 3,848,981 | 11/1974 | Chedister | 352/157 |
| 3,857,633 | 12/1974 | Easterly | 352/157 X |

*Primary Examiner*—Monroe H. Hayes
*Attorney, Agent, or Firm*—Hane, Baxley & Spiecens

[57] ABSTRACT

There is disclosed a motion picture projector with self-threading mechanism with which has been combined automatic electric clutch and brake means for forward and reverse operations to permit the projector to be used in a search mode, an automatic film tension control means, an automatic lower-loop setter, a switch for stopping the projector upon loss of the upper loop, a frame counter and a pre-threaded projection magazine which fits over the reel arms and threads in the same manner as the conventional reels. The projector has in the front panel of its enclosure a slot into which is insertable a length of film extending between the two reels of the projector. After dropping a length of film into the slot the lever is pivoted from its leading position into its threading position. While being so pivoted, the lever sequentially causes locking of the film to the take-up sprocket, then to the supply sprocket, then forming the lower loop, then the upper loop, and finally pressing the film into the film channel. The threading mechanism further comprises a control switch arm selectively settable from an OFF position either on forward or on reverse. Setting the control on forward causes wrapping of the film about the capstan of the projector and starts operating of the projector in a conventional manner. Setting of the switch arm on reverse with the pivotal lever in its threading position causes release of the film from the capstan and driving of the film through the projector in reverse direction.

14 Claims, 39 Drawing Figures

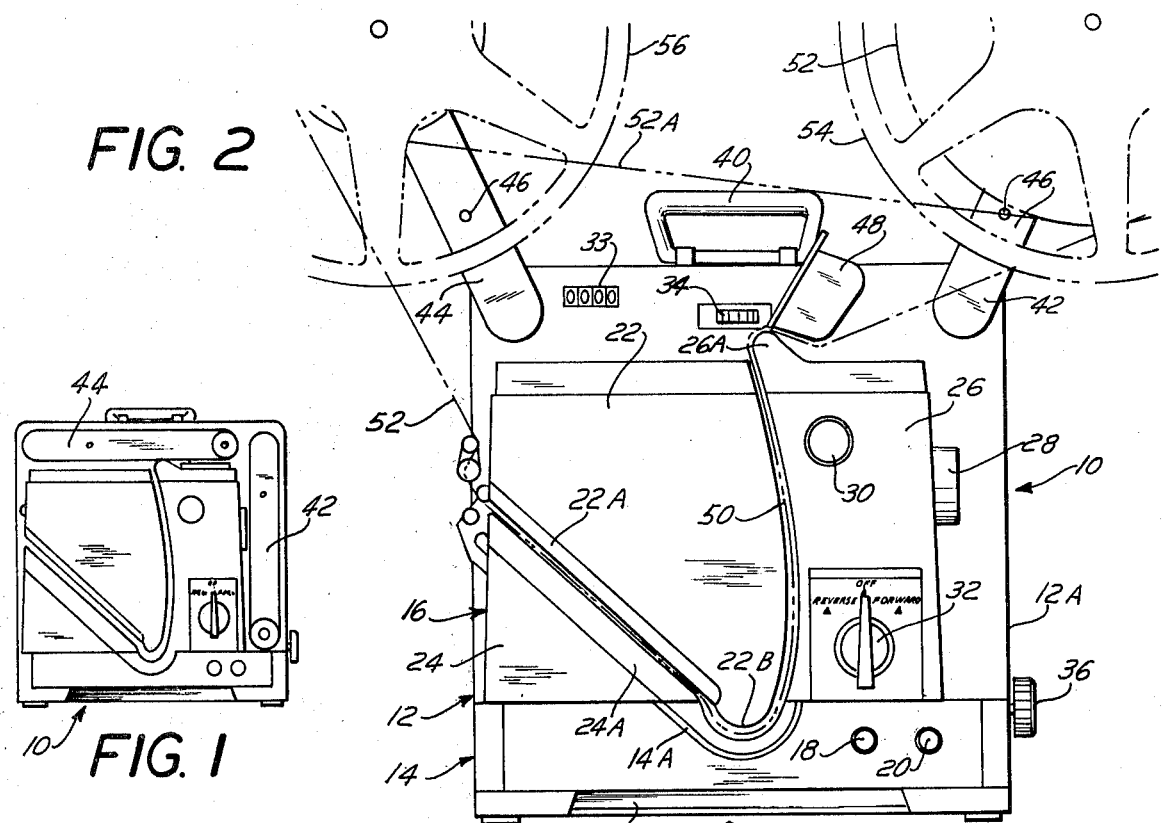
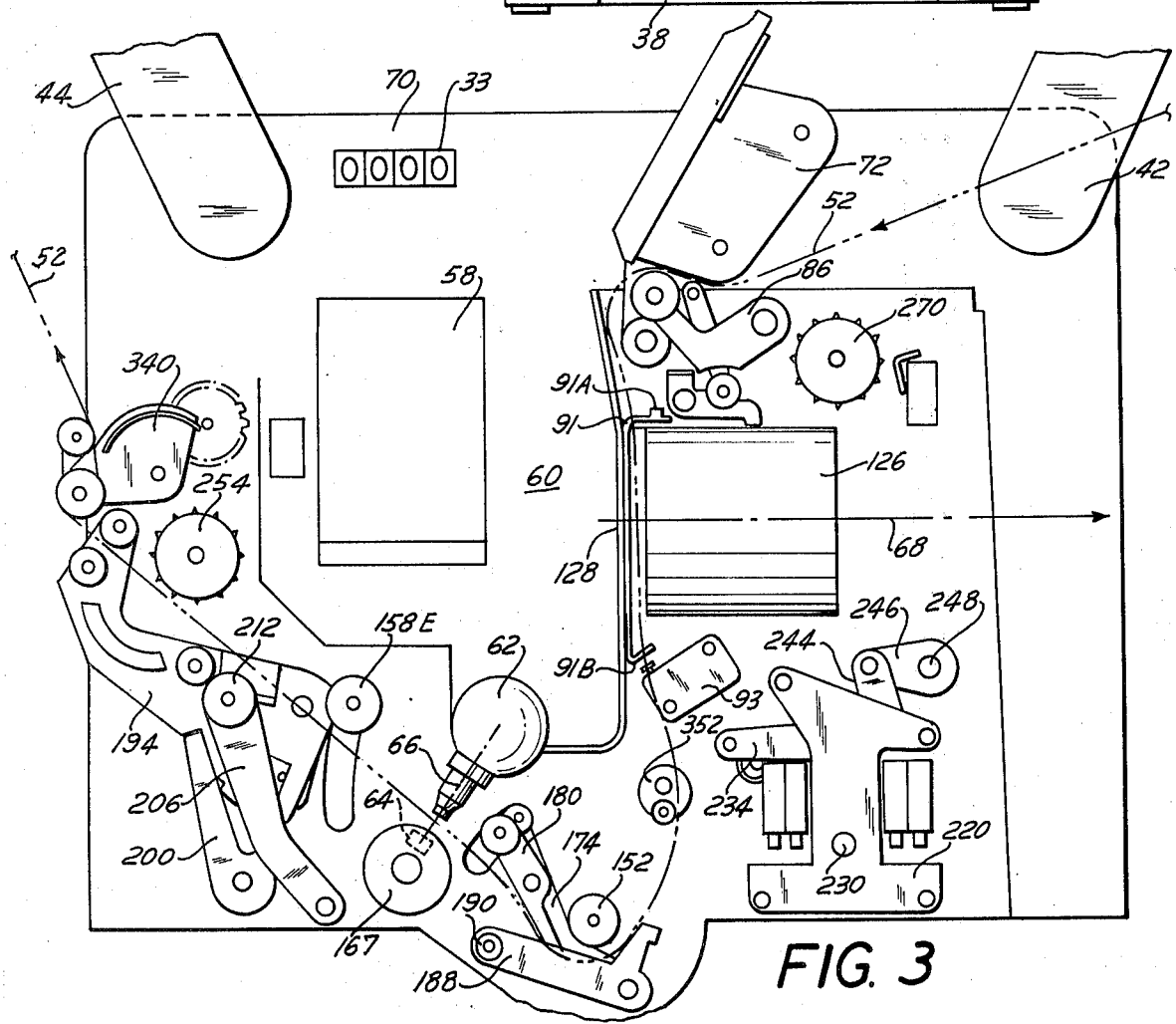

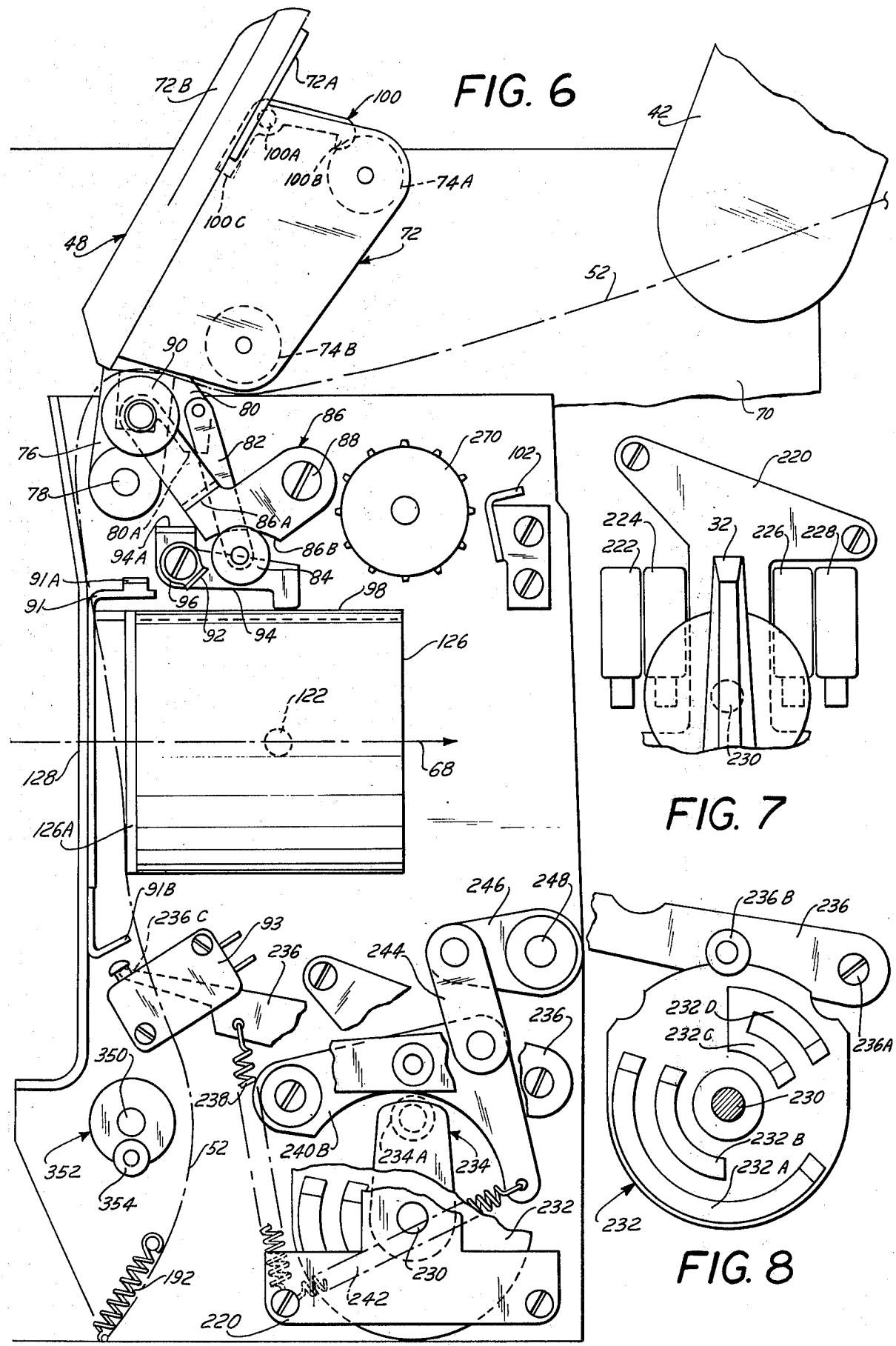

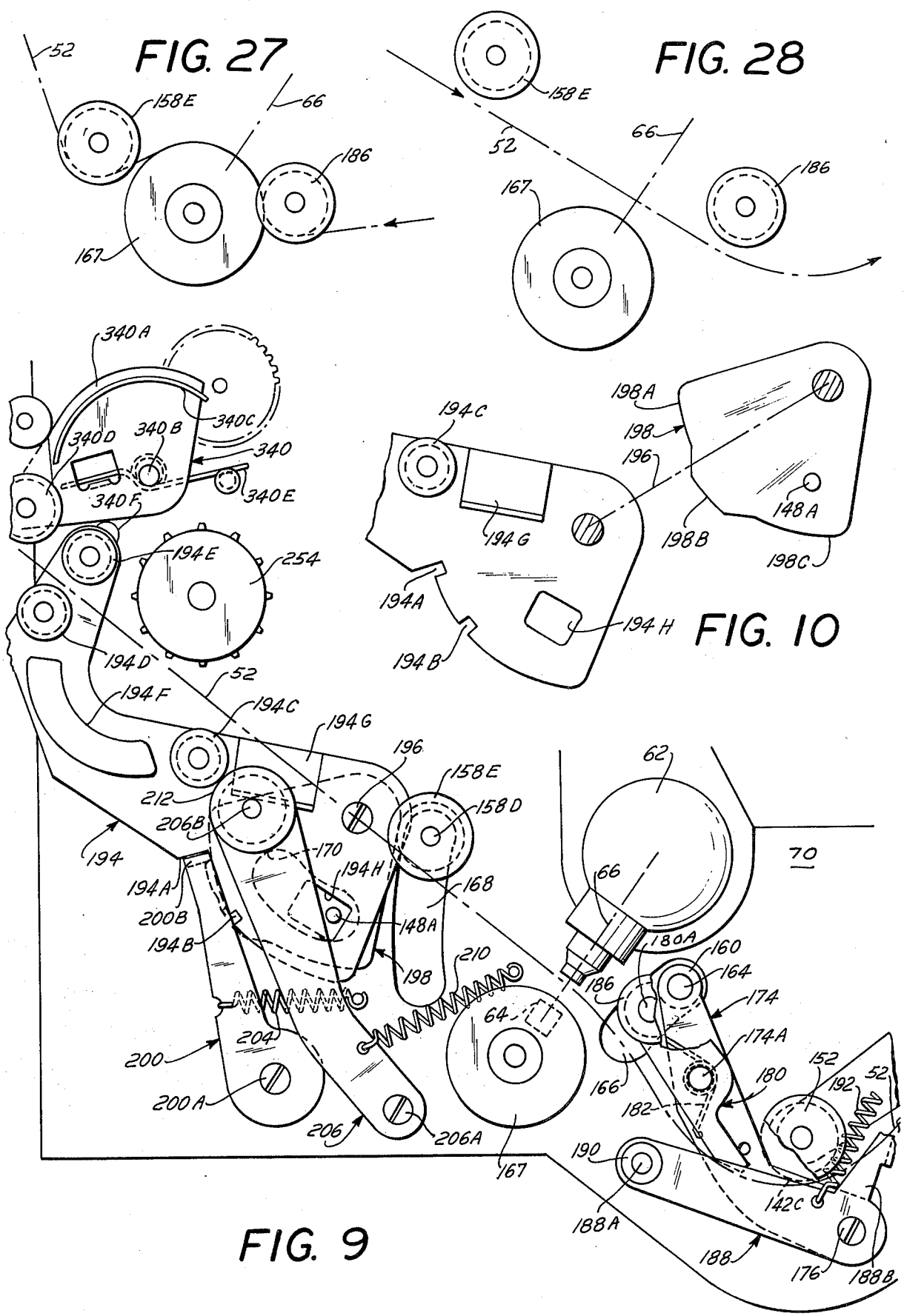

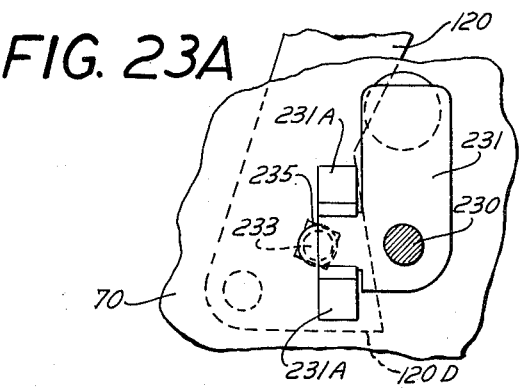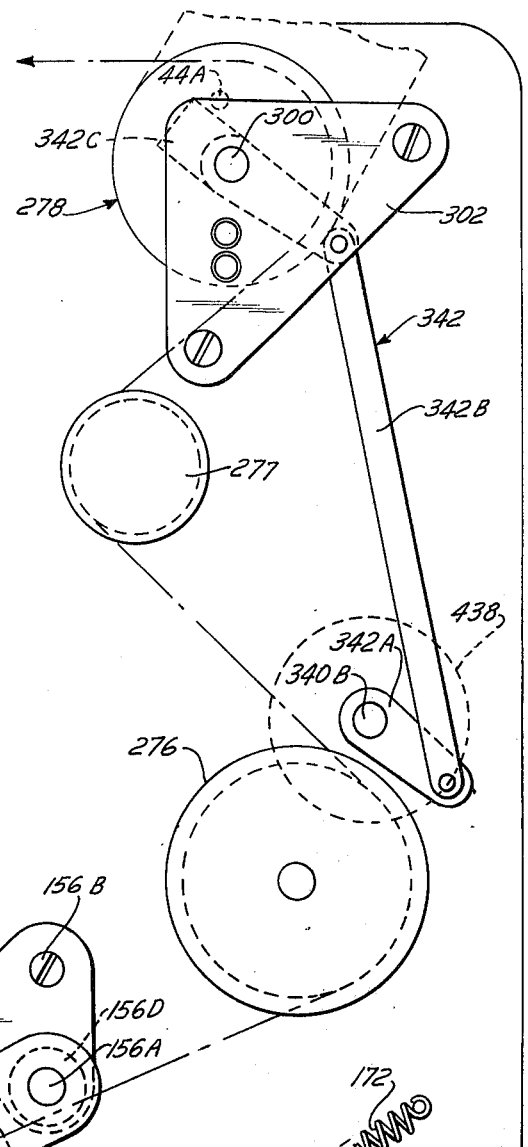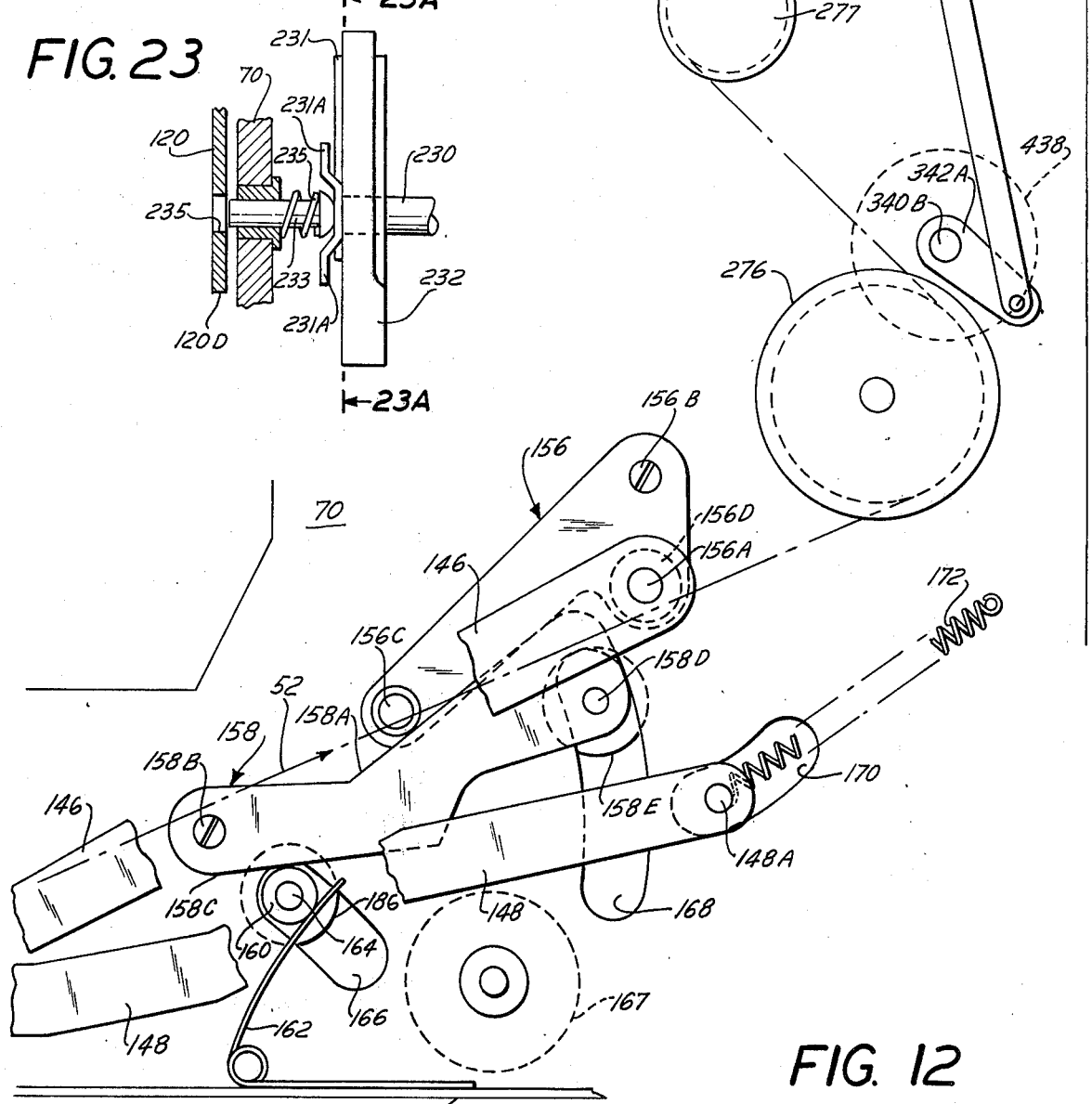

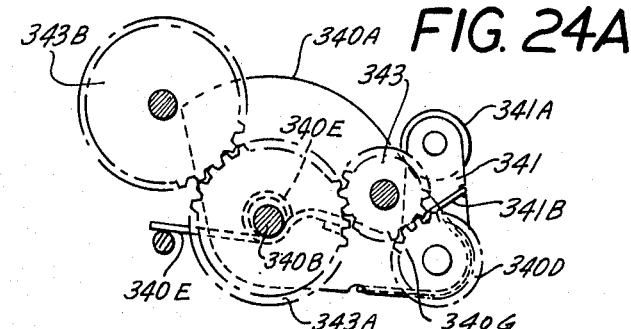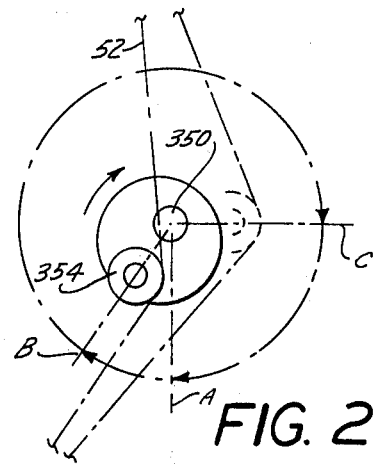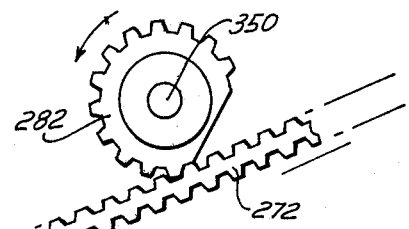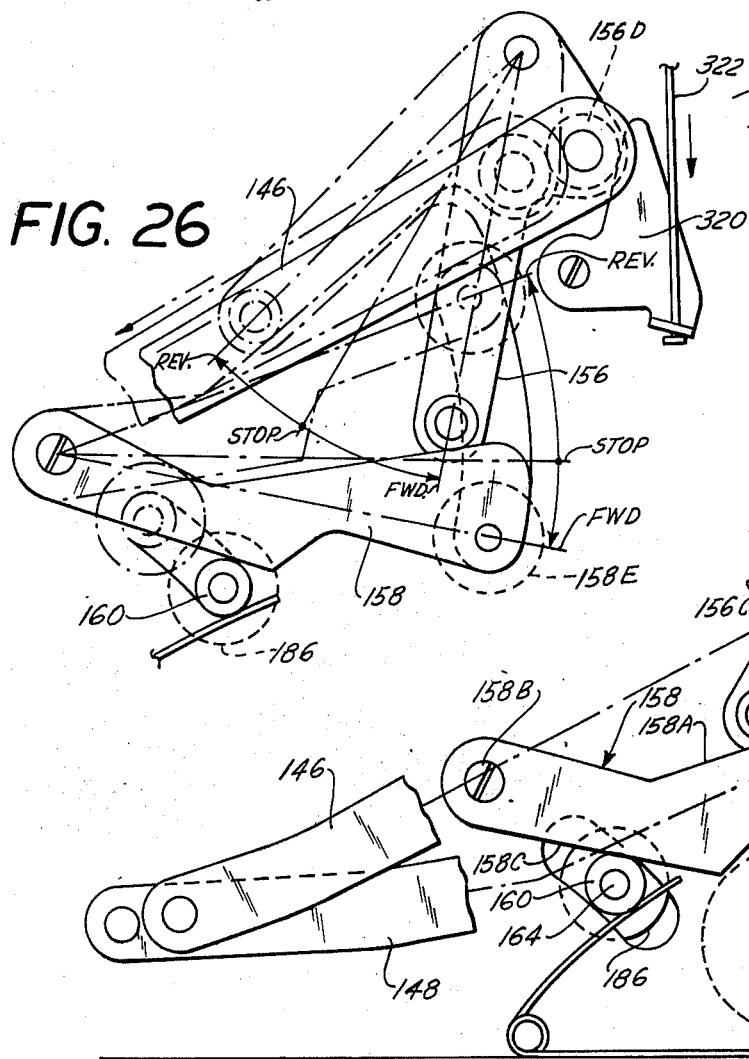

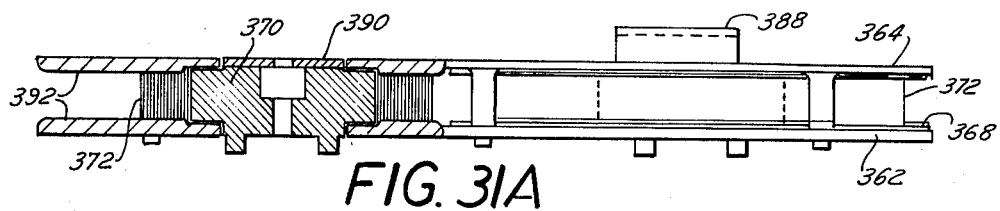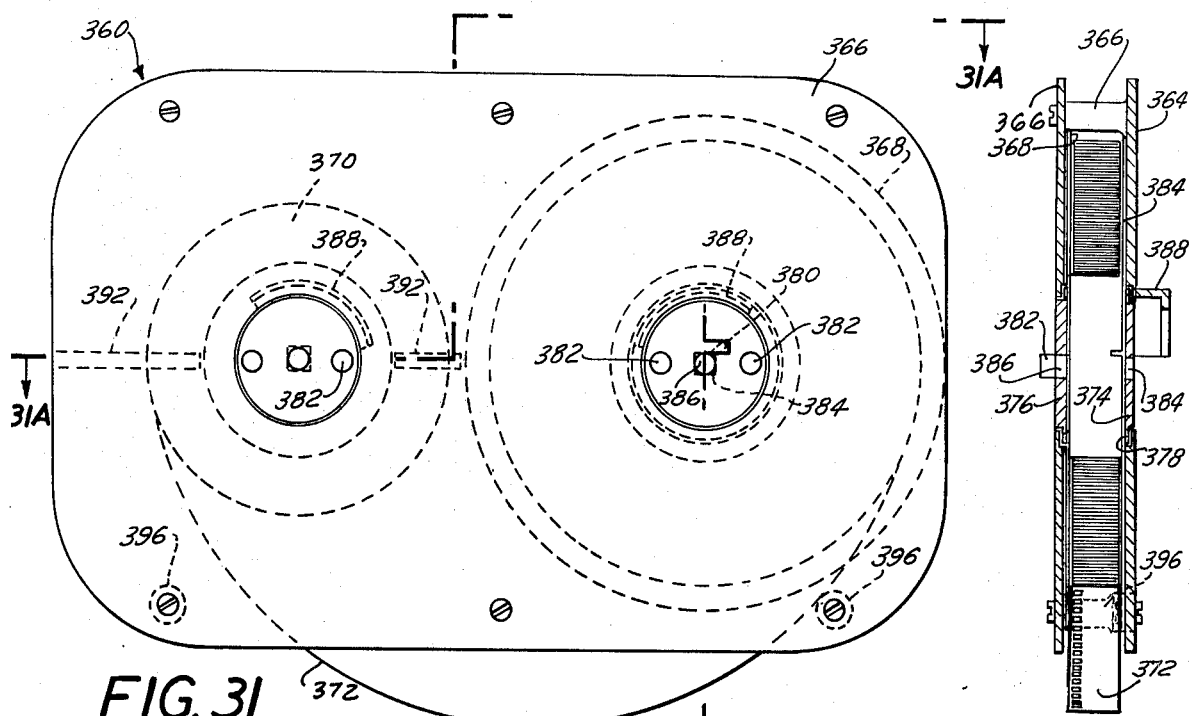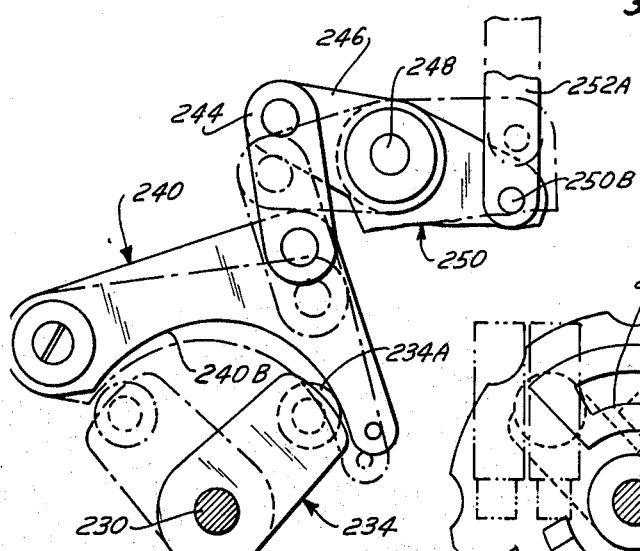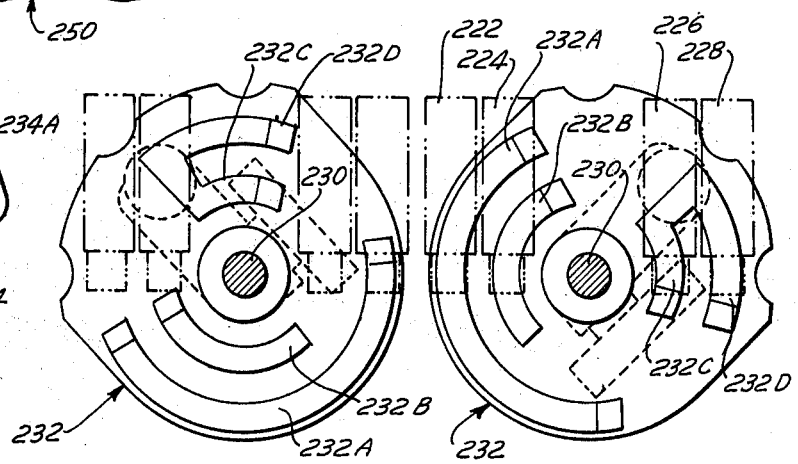

SELF-THREADING MOTION PICTURE PROJECTOR

The present invention relates to self-threading motion picture film projectors, either silent or sound, and more particularly to mechanisms for rapid and precise control of film feeding in both forward and reverse directions to permit efficient search for a specific picture frame; to means for preventing damage to film when a film loop is lost; to automatic tensioning of the film; and to a simple magazine to allow rapid and efficient exchange of reels.

BACKGROUND

With projectors now in wide use for teaching and training purposes and also increasingly for retrieval of information, the recurring problems are threading and removal of film from the projector, precise operation of the projector in both forward and reverse for locating specific frames of film, protection of the film from mechanical damage during the starting, running and stopping phases, and maintaining proper film tension at the reel. Solving the three latter problems in an automatically threading projector is especially important inasmuch as most users of these devices are not especially skilled in projector operation and lack the expertise required to manipulate the film in a manner to insure its safety from damage during use. Although many proposals have been made to simplify threading and removal of film, to provide forward and reverse operation for rapid search as well as to provide for the safety of the film in the event of loop loss, all of the known mechanism require accurate, skilled manipulation of the film. Self-threading projectors of the general kind above-referred to are disclosed in application Ser. No. 370,015 filed June 14, 1973 and now issued as U.S. Pat. No. 3,848,981.

THE INVENTION

It is a broad object of the invention to provide a novel and improved threading mechanism for a projector of the general kind above-referred to which reduces the skill demanded of the operator to an absolute minimum by automatically performing all the required threading and loop functions.

A more specific object of the invention is to provide a drive mechanism for the reel arms which will permit rapid, convenient switching from forward to reverse operation and vice versa without either film spillage or undesirable tightening of the film ("cinching") on either reel.

Another more specific object of the invention is to provide a programmed magnetic clutch and brake means for achieving the above object.

Still another specific object of the invention is to provide loop control means to prevent damage to the film through loss of either the upper or lower loop.

A further object is to provide a means for automatically regulating the tension of film on the takeup reel through action of the magnetic clutch and brake means.

A still further object is to provide a film magazine adapted to use with the projector of this invention.

SUMMARY OF THE INVENTION

The afore-pointed out objects, features and advantages and other objects, features and advantages which will be pointed out hereinafter are obtained by providing in a suitable wall of the projector casing or enclosure, such as the front panel, a slot for loading the projector with the film to be threaded by dropping a length of film into the slot.

The threading mechanism comprises a chassis stationarily mounted within the enclosure parallel thereto. This chassis mounts a first sprocket which constitutes the take-up sprocket when the projector operates in forward mode, a second sprocket which constitutes the supply sprocket when the projector is operated in the forward mode, a lower loop forming assembly, an upper loop forming assembly and a pressure assembly for holding film in the film channel. After insertion of the film into the slot by simply dropping a length of film extending between the two reels into the same, a control lever is pivoted from an initial loading position into a threading position. As the control lever is so pivoted it causes stepwise and sequentially locking of the film to the first sprocket, then to the second sprocket, then operates the lower loop assembly for forming the lower loop, then the upper loop assembly for forming the upper loop, and finally the film pressure assembly for guiding the film into the film channel and holding it therein for action by the claw transporting the film during operation. The projector is now ready for operation.

To start the projector, the switch control arm is set on forward. This setting activates a further assembly for moving the film into coaction with the capstan of the projector and also starts the drive of the projection lamp. Operation of the projector in reverse mode is effected by setting the switch control arm on reverse. This reverses the drive and also frees the film from coaction with the capstan. To effect fast rewind of the film the pivotal lever is returned into its loading position and the switch control arm is set on reverse. Return of the lever into its loading position frees the film from the sprockets and the capstan so that it can be freely pulled through the slot. Of course, it is also possible to remove the film from the slot after it is freed by return of the lever into the loading position and rewind it directly between the two reels. Each of the two reel arms carrying the reels is driven through a magnetic clutch-brake. Electronic circuitry associated with the magnetic clutch-brakes insures the proper torque levels required for rewind, reverse take-up and braking. Thus, the clutch-brakes provide the slip necessary to prevent damage to the film from excessive tension during reverse. The clutch-brake is automatically powered to a substantially locked (high torque) condition for the front reel during fast rewind. If during projection the lower loop is lost an automatic loop setter restores it to proper length. If the upper loop is lost a switch opens the motor drive circuit and stops the projector. Take-up film tension is controlled via a tension-responsive spring-pressed roller arm which regulates the clutch-brake torque through a potentiometer.

DETAILED DESCRIPTION OF THE INVENTION

In the accompanying drawing a preferred embodiment of the invention is shown by way of illustration and not by way of limitation.

IN THE DRAWING

FIG. 1 is an operating side-view of the projector ready for carrying or storage;

FIG. 2 is an operating-side view of the projector set up for operation, a loop of film extending between supported reels being shown inserted into the projector loading slot;

FIG. 3 is an operating-side view of the projector in the loading mode, the left hand covers being swung away and the right hand cover being removed to show control and film positioning parts;

FIG. 6 is an operating-side view of the front portion of the projector in the loading mode, certain parts being deleted for clarity;

FIG. 7 is a view of the operating mode control handle and micro-switches associated with control parts shown in FIG. 6;

FIG. 8 is a view of the operating mode control switch cam and detent means;

FIG. 9 is an operating-side view of the rear portion of the projector in the loading mode, certain parts being deleted for clarity;

FIG. 10 is a perspective exploded view of the rear sprocket shoe-guide arm and cam shown assembled in FIG. 1;

FIG. 12 is a driving-side view of the rear portion of the projector in the loading mode, certain parts being deleted for clarity;

FIG. 16 is a driving-side view of the rear portion of the projector in the operating mode;

FIG. 19 is a view of the operating mode switch cam in the Forward mode, the micro-switches indicated in phantom outline;

FIG. 20 is a view similar to FIG. 19 except that the cam is shown in the Reverse mode;

FIG. 21 is a view of operating mode control parts, solid outline indicating the Forward mode and dot-dash outline indicating the Reverse mode;

FIG. 23 is a view of the drive interlock in partial section;

FIG. 23A is a view of the drive interlock along lines 23A of FIG. 23;

FIG. 24 is a detailed view of the film snubber, automatic tension and footage counter drive in partial section;

FIG. 24A is a view of the gearing of the film snubber along lines 24A of FIG. 24;

FIG. 26 is a detail view of the driving side showing part of the mechanism in the Forward mode, the Reverse mode being indicated in dot-dash outline;

FIG. 27 is a schematic view of the sound scanning area and film in Forward mode;

FIG. 28 is similar to FIG. 27 except that the Reverse is shown;

FIG. 29 is an operating-side detail view of a diminishing lower film troop triggering the automatic looping mechanism;

FIG. 30 is a driving-side detail view corresponding to the action shown in FIG. 27;

FIG. 31 is a view of the preloaded film magazine in side elevation;

FIG. 31A is a partial section of the magazine along lines 30A of FIG. 30;

FIG. 31B is an elevational section of the magazine along lines 30B of FIG. 30.

PROJECTOR SET-UP

Figure 4:
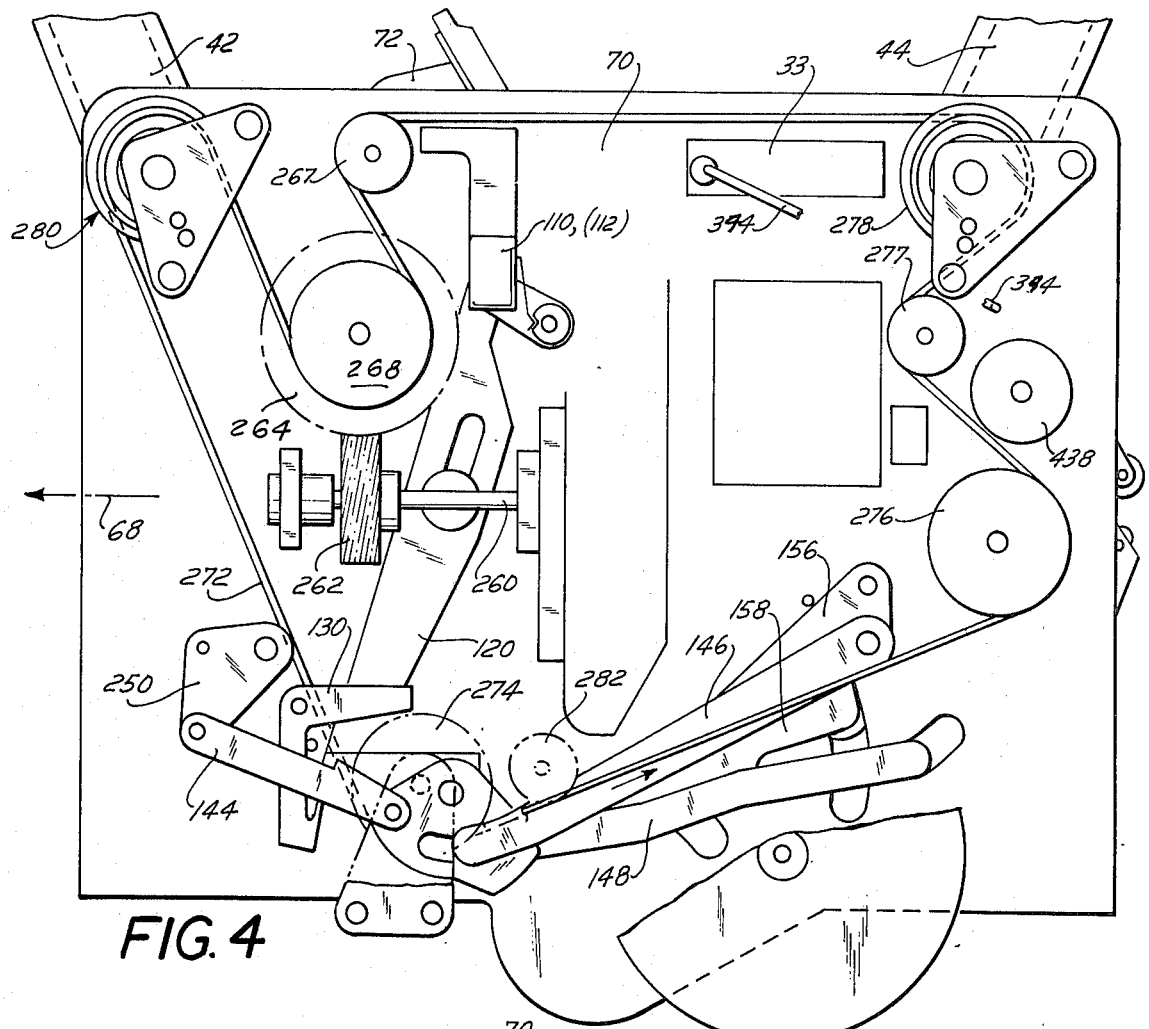
FIG. 4 is a driving-side view of the projector in the loading mode, the cover being removed to show the belt drive and film positioning parts associated with parts shown in FIG. 3.

Referring to FIGS. 1 and 2, projector 10 comprises a housing 12 including two compartments, namely, a lower compartment 14 and an upper compartment 16. Compartment 14, containing the sound electronics, mounts a volume control 18 and a tone control 20. This portion of the projector, including a speaker mounted in front face 12A, is not part of the present invention and is therefore not further described.

Compartment 16 is provided with a cover 22 hinged at the upper edge, a cover 24 hinged at the rear or left-hand edge and a cover 26 fixed at the forward portion. Covers 22 and 24 give ready access to the film transport mechanism and the lamp housing. Cover 26, opened only for servicing, gives access to operating controls and the projection optics. Externally, cover 26 shows a lens barrel 28, a focusing control knob 30 and an operating control handle 32 mounted on an escutcheon indicating the operating mode (Off, Forward, Reverse). 33 is a digital-dial footage counter for aid in locating specific frames particularly when the projector is used for retrieving specific information in the search mode.

For identification only, not being part of the invention, housing 12 shows a framing knob 34, a tilt-clamping knob 36, an electrical cord storage compartment 38 and a carrying handle 40.

Housing 12 supports pivotally a supply reel arm 42 and a take-up arm 44 each of which carries near its end a spindle for receiving a film reel. These arms, when folded as seen in FIG. 1, do not extend beyond the outlines of housing 12, making the projector compact for packing and storage. When opened out to the position of FIG. 2, a detent means between the arms and the housing locks in to prevent collapse. To fold back the arms, a push-button 46 in each arm releases the detent. In this regard it may be observed that parts of the film mechanism not seen in FIG. 1 are exposed in FIG. 2. The retraction of these parts, resulting in a more compact assembly, is effected by employing a linkage with arm 44. This feature will be more fully described later.

Two features seen in FIG. 2 are part of the invention, namely, a gate lever 48 and a slot 50 defined by the common separations of covers 22, 24 and 26. The upper projection 26A of cover 26 and the lower projection 22B of cover 22 are founded and taper inwardly to a lesser radius. Compartment 14 along lines 14A, cover 22 along line 22A and cover 24 along line 24A all slope towards slot 50. By such arrangement, a single-step procedure loads the projector. A second step places the projector in the operating mode.

LOADING THE PROJECTOR

FIG. 2 shows a reel of film 52 on a supply reel 54, the film lead connected to a take-up reel 56. The bridging section 52A of film 52 is merely extended into a loop, slipped between lever 48 and projection 26A and, aided by the sloping surfaces adjoining slot 50, is deposited therein. While still grasping the film loop, a slight pull takes up the slack as the film aligns itself into the plane of the reels, first lying in a clear channel passing through the film guide and transport mechanism, then snugging into a path of minimum length, as several guides are engaged.

THE MECHANISM ASSOCIATED WITH PLACING THE PROJECTOR IN THE OPERATING MODE

A downward movement of lever 48 locks in the film and readies the projector for operation. The construction of this mechanism is now described.

For purposes of clarity, construction details not a part of the invention are omitted. These details, however, are schematically indicated in FIG. 3 by the following references: a projection lamp, motor and fan in the area 58; a shutter, transport and framing mechanism in the area 60; an exciter lamp for the sound track in housing 62 and a photo-electric cell 64 in line with the exciter lamp optics as indicated by the dot-dash line 66. An arrowed line 68 indicates the projection axis.

Referring to the figures generally with periodic references to figures in particular, unless and until stated otherwise, the projector is assumed in the loading position with the operating mode handle 32 in the "off" position.

The entire mechanism of the invention is mounted on a chassis 70, that portion seen on the operating side in FIG. 3 cooperating with the portion seen on the driving side in FIG. 4 by means of members passing through openings in the chassis wall.

Gate lever 48, by which the projector is manually changed from the loading to the operating mode, shows a frame 72 spindling a pair of sprocketed film guides 74A and 74B, as best shown in FIG. 6. Frame 72 extends to a pivotal support 76 on chassis 70 carrying a shaft 78 therethrough. Shaft 78, fixed to support 76, turns with lever 48 thereby operating parts behind the chassis, to be described. A plate 80 attached to frame 72 pivots a link 82 carrying a lift roller 84. Plate 80 also has a tripping cam 80A.

An upper loop 86, pivoting on a bearing 88, has an offset 86A and terminates in a bearing spindling a looping film guide roller 90. A loop loss arm 91 for detecting loss of the upper loop carries an upper portion 91A which is positioned in the path of guide roller 90 and a lower portion 91B which operates switch 93 in a manner to be described. Arm 86 is shown supported by roller 84 contacting the arm at an arcuate edge 86B. A fixed bracket 92 assures that link 82 does not turn clockwise from the position shown thereby losing contact between roller 84 and edge 86B.

A looper latch 94 is pivotally supported at a bearing 96. While free to turn for tripping, the latch rests on a bearing plate 98. The short leg of the latch is bent as at 94A and is seen in this position as restraining arm 86 against counterclockwise rotation.

To secure gate lever 48 in the operating mode, a latching means is provided. A spring, not shown, biases a latch arm 100 clockwise about a pivot 100A to the position shown. The latching portion 100B of the arm engages a latch lock 102 on chassis 70. Frame 72 also serves as a positive stop. To release the latch, a finger pad 72A pivotally supported inside a handle 72B is squeezed. The resulting pivoting motion is transferred to an extension 100C on arm 100 thereby turning the arm counterclockwise out of latch lock 102.

Figure 11:
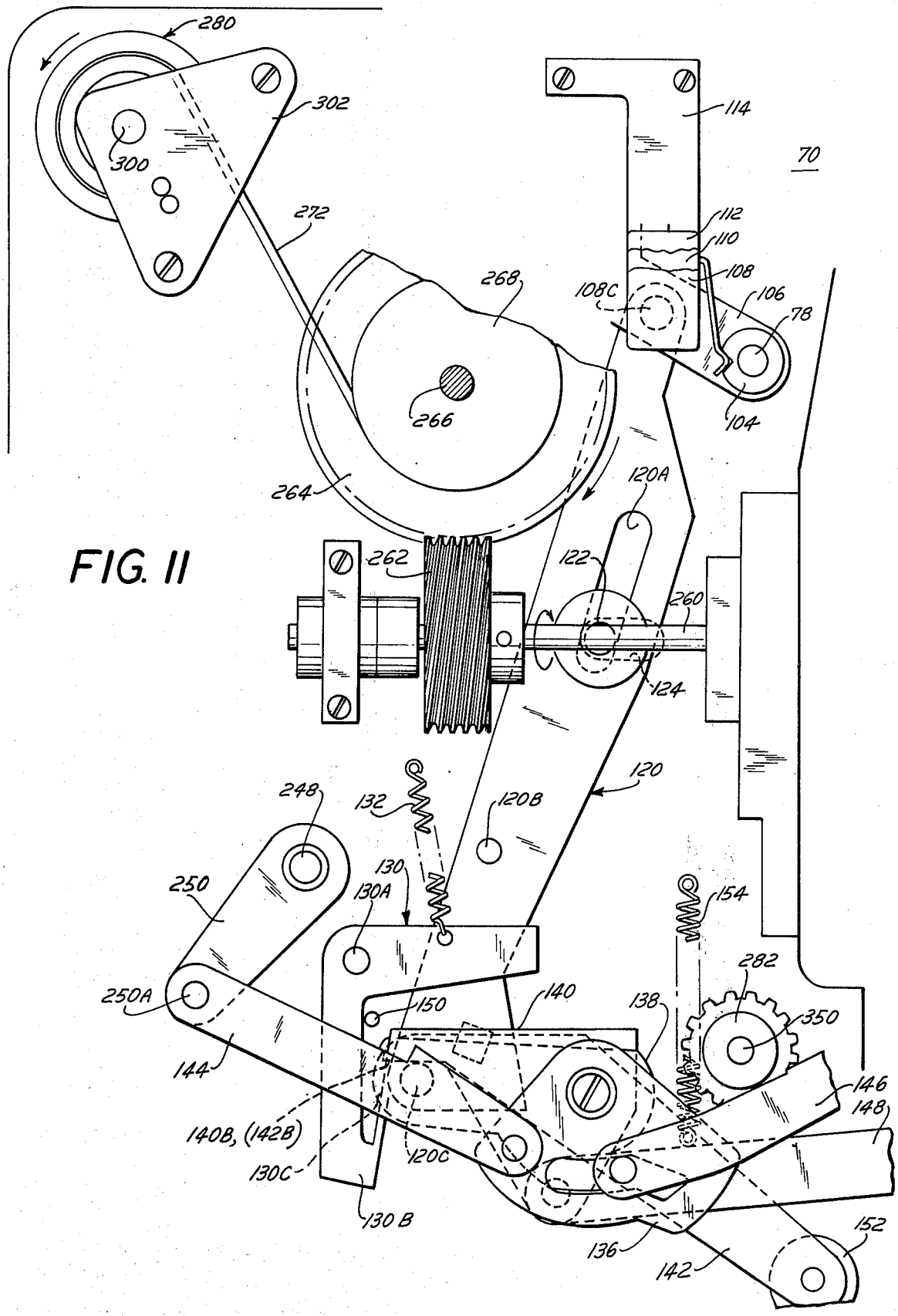
FIG. 11 is a driving-side view of the front portion of the projector in the loading mode, certain parts being deleted for clarity.

Shaft 78 on the driving side is shown in FIG. 11 supporting a cam 104 and an actuating arm 106. Three microswitches 108, 110 and 112 are mounted side-by-side on a bracket 114 so that all three switches are operated by cam 104.

Arm 106 carries a pivot pin 108C near its end which in turn spindles a link 120 which is moved downwardly when the lever 48 is lowered into locked position. Link 120 is provided with a slot 120A, a tripping pin 120B and a pin 120C. Slot 120A engages a pin 122 that passes through an opening 124 in chassis 70 and is fixed in a horizontally slidable lens barrel 126 to which is attached a film pressure plate 126A shown in FIG. 6. As is evident, the downward movement of link 120 is translated into a horizontal movement of housing 126 towards film gate 128 (FIG. 6). Pin 120B in its downward movement turns a tripping arm 130 spindled on a bearing 130A. This arm is formed with a hook 130B that terminates in a tripping face 130C. Turning against a counter-clockwise bias by a spring 132, face 130C moves out from under parts to be described.

Figure 17:
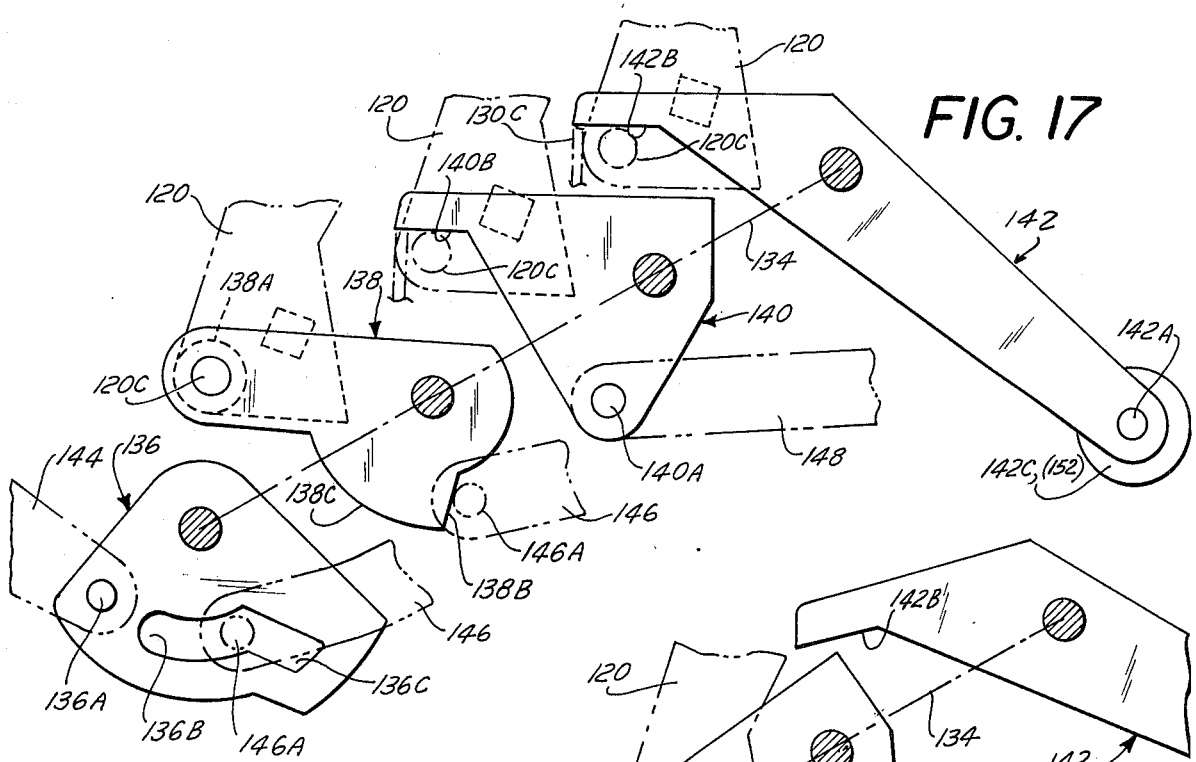
FIG. 17 is a perspective exploded view of four actuating parts in the loading mode and shown assembled in FIG. 11.

A bearing 134 spindles four members. Referring to FIGS. 11 and 17, these members are: an operating mode actuating arm 136, a drive link arm 138, a rear sprocket shoe trip arm 140 and a lower loop roll arm 142.

Arm 136 spindles a link 144 at a pivot 136A. An arcuate slot 136B extends into an angularly disposed detent 136C. This slot accepts a pin 146A fixed on a link 146.

Figure 18:
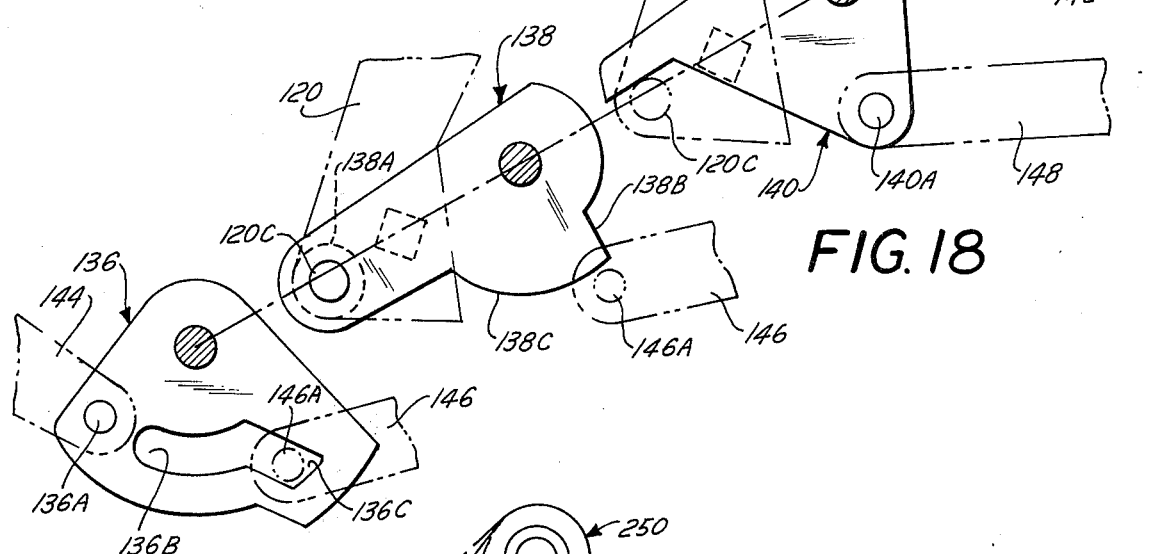
FIG. 18 is a view similar to FIG. 17 except that the parts are in the operating mode and shown assembled in FIG. 15.

Arm 138 has a bearing 138A that spindles pin 120C on link 120. A cam 138B acts as a stop for pin 146A as link 146 is biased to the left by a spring and mechanism to be described. By comparing FIGS. 17 and 18 it will be seen that rotation of arm 136 does not affect link 146 until arm 138 is turned counter-clockwise forcing link 146 to move into slot 136C. Completion of the rotation of arm 138 brings arcuate edge 138C across pin 146A. Pin 146A is then locked in slot 136C and arm 136 will move arm 146 to the right.

Arm 140 spindles a link 148 at a pivot 140A. A nose 140B caught up by a latch 130C keeps arm 140 in the position shown in FIG. 17. Pin 120C shown in contact with nose 140B turns arm 140 clockwise, when link 120 is raised, until latch 130C is cleared and trip arm 130 can then snap under nose 140B. A pin 150 serves as a stop as seen in FIG. 11.

As shown in FIG. 17, arm 142 spindles a collar 142C and a loop roller 152 at a bearing 142A. A nose 142B functions in the same manner as nose 140B.

A biasing spring 154 for arm 142 is shown in FIG. 11. The biasing spring for arm 140 is in a part of the mechanism to be described.

Referring to FIG. 12, link 146 is spindled on a bearing pin 156A on a sound-capstan-wrap actuating arm 156. This arm, spindled on a bearing at 156B carries a cam follower 156C. A collar 156D actuates the take-up clutch mechanism to be described. Follower 156C bears on a cam surface 158A on an arm spindled on a bearing at 158B. Arm 158 has a second cam surface 158C against which a cam follower 160 is urged by a spring 162. A shaft 164 spindling follower 160 extends through an arcuate opening 166 to a sound-capstan-wrap 167 mechanism to be described. Arm 158, further, has a shaft 158D extending through an arcuate slot 168 to a wrap roller 158E.

The action following rotation of arm 138 now becomes evident. Spring 162, through cam follower 160, biases arm 158 counter-clockwise. Arm 158, through cam follower 156C, biases arm 156 clockwise, thereby urging link 146 against arm 138.

Referring to FIG. 12, link 148 at the far end supports a pin 148A extending through an arcuate opening 170 to a rear shoe mechanism to be described. The biasing spring noted above for arm 140 is indicated at 17a.

On the operating side, referring to FIGS. 9 and 10, a shaft 164 emerging through an opening 166 is fixed to a pinch roller actuating arm 174. Arm 174, spindled on a bearing 176, carries a pin 174A, which, in turn, spindles an arm 180. Arm 180, biased counter-clockwise by a coil spring 182, against a stop 174A on arm 174, spindles a pinch roller 186 on a shaft 180A.

A pinch roller damper arm 188, also spindled on bearing 176, is in contact with collar 142C indicated in phantom outline behind loop roller 152. A damping roller 190 is spindled on pin 188A. Arm 188 is biased clockwise by a spring 192 and stopped by a nose 188B contacting a chassis bracket not shown. It therefore becomes evident that downward movement of arm 142 will lower roller 190.

Referring to FIGS. 9 and 10, a rear sprocket shoe guide arm 194 is spindled on a chassis-mounted bearing 196. Arm 194 includes a pair of detents 194A and 194B, three film guide rollers 194C, 194D and 194E, a shoe 194F, a pad 194G and an opening 194H.

A cam 198 is separately spindled on a bearing 196. Cam 198 is fixed to pin 148A protruding from opening 180 in the chassis wall, the rear end of the pin terminating through an opening 194H. Thus, when link 148 is moved clockwise in FIG. 9, the cam turns until the pin touches arm 194. From this point on both turn together.

A trip arm 200, spindled on a bearing 200A, is biased clockwise by a spring 204. The end of arm 200 is bent into a pawl 200B. This pawl is shown engaged in detent 194A. Returning to cam 198, a dwell portion 198A is clear of pawl 200A because it is below the bottom of detent 194A. A rise portion 198B is higher then the detent. It now becomes evident that movement of link 148 moves arm 200 out of one detent, turns arm 194, finally permitting the pawl to drop into the other detent. The result is that arm 194 is held firmly in either of two positions, the reverse action taking place from dwell 198C.

A damper arm 206, spindled on a bearing at 206A is biased clockwise by a spring 210. The end of arm 206 spindles a roller 212 on a pin 206B that extends rearward into contact with bracket 194G. This bracket therefore serves as a stop for the clockwise bias of the arm.

THE MECHANISM ASSOCIATED WITH PROJECTOR OPERATING MODE CONTROL

The construction of the mechanism connected with movement of the operating mode control from "Stop" to "Forward" and "Reverse" is now described.

Referring briefly to FIG. 2 and more particularly to FIGS. 6, 7 and 8, control handle 32 is mounted over an escutcheon indicating that the projector is in the "off" position when the handle is vertical, in the Forward position when turned 45° clockwise and in the Reverse Position when turned 45° counterclockwise.

A bracket 220, mounting four micro-switches 222, 224, 226, and 228, spindles a control shaft 230. At the near end, shaft 230 mounts handle 32, at an intermediate point a cam and detent plate 232 and at the far end an arm 234 spindling a cam follower 234A. Beyond arm 234 shaft 230 operates two additional switches 428 and 430 to be described.

A cam follower arm 236, spindled on a bearing at 236A, in turn spindles a cam follower 236B. Cam follower arm 236 also carries at its outer end a finger 236 which coacts with the under side of portion 91B of arm 91 in a manner to be described. The follower arm, biased counter-clockwise by a spring 238, thus detents the assembly on shaft 230 in each of the three positions described above.

Cam 232 has four rises: a rise 232A operating micro-switches 222 and 228, a rise 232B operating micro-switch 224, a rise 232C operating micro-switch 226 and a rise 232D operating micro-switch 228. These operations are shown in FIGS. 19 and 20 to be described further under "Operation".

Referring now to FIGS. 6, 11 and 21 in particular, cam follower 234A cooperates with a cam lever 240 spindled on a bearing at 240A. Lever 240 has a cam surface 240B contoured generally on a radius eccentric to the left with respect to shaft 230. Biased towards cam follower 234A by a spring 242, it becomes apparent that lever 240 turns counter-clockwise when handle 32 is turned to "Forward" and clock-wise when the handle is turned to "Reverse". A link 244 and an arm 246 transmit this movement to a shaft 248 passing through a bearing to the driving side of chassis 70.

Figure 25:
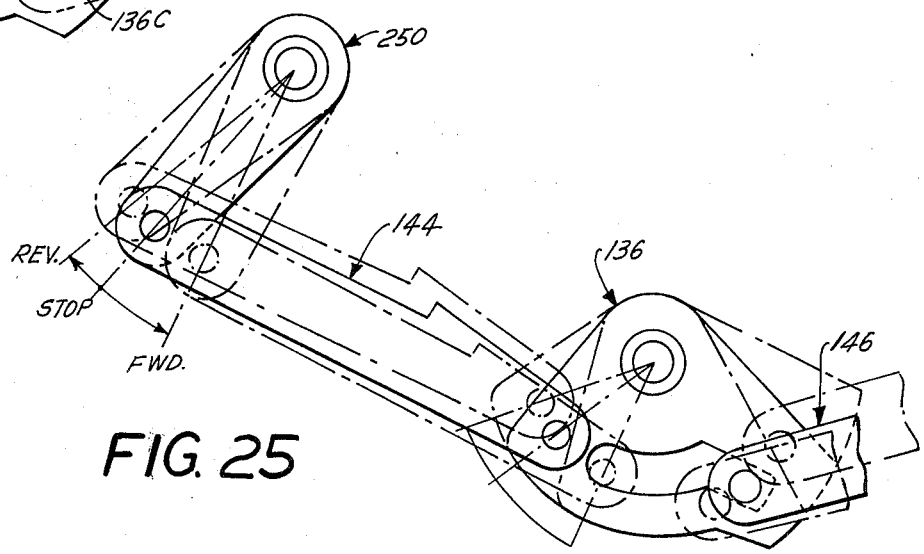
FIG. 25 is a detail view of the driving side showing part of the linkage in the operating mode; the Stop mode being shown solid and both the Forward and Reverse modes being shown in dot-dash outline.

Referring to FIG. 11, shaft 248 emerges and is fixed to a lever 250 spindling link 144 on a bearing at 250A. Therefore, from the control linkage described above, it is seen that lever 250 turns counter-clockwise for "Forward" and clockwise for "Reverse". This may be seen in FIG. 25 and, carried further through the linkage in FIG. 26, both figures to be described later under "Operation".

As shown in FIGS. 19, 20, 23 and 23A there is also associated with control shaft 230 a cam arm 231 carrying a pair of cam surfaces 231A. These cam surfaces coast with a pin 233 biased toward the cam surfaces by a compression spring 235. The pin is carried by a bushing set in chassis wall 70 and is moved inwardly when upon rotation of shaft 230 from the Off position of operating control handle 32 from the neutral position to either forward or reverse setting. When handle 32 is in either of the latter positions pin 233 engages hole 235 in link 120 of lever 48 when the latter is in lowered position. Thus, lever 48 cannot be raised when the projector control handle is set for either forward or reverse. When lever 48 is in raised position and the projector is in either forward or reverse setting lever 48 cannot be closed because the lower end 120D of link 120 will strike protruding pin 233. Hence, lever 48 cannot be closed while film is passing through channel 50, thus avoiding damage to the film perforations which would occur in bringing the film against the relatively slow moving teeth on sprocket 270.

THE MECHANISM ASSOCIATED WITH THE PROJECTOR DRIVE

Referring to FIGS. 4 and 11, not shown, drives a shaft 260 mounting a worm gear 262. A worm-driven gear 264 is fixed on a shaft 266 to which a belt-driving pulley 268 is fixed on the near end. The far end, extending through the chassis, has fixed on it a film feed sprocket 270 shown in FIGS. 3 and 6. A belt 272, after leaving pulley 268, passes around the pulley of rewind clutch 280, an idler pulley 274, a pulley 276 driving a take-up sprocket 254, a second idler pulley 277, a pulley on take-up clutch 278 and an idler pulley 287. The belt and pulleys are the positive drive type, the belt having teeth on both sides. Between pulleys 274 and 276, the belt passes close to the cut wall of a segmented pulley 282 associated with an automatic lower looping means to be described. The trace of the belt in the foregoing proceeds in the direction in which the belt is driven in "Forward" as indicated by the arrows.

Referring to FIGS. 11 and 12, the take-up clutch 278 and the rewind clutch are connected to the shafts and drives of the respective arms which they drive. Clutches 278 and 280 are identical in structure and function. Their detailed construction is shown in FIGS. 22, 22A, 22B and 22C. Each clutch consists essentially of a pulley 290, an armature 292, a magnetic structure 294 including an electrical coil 296, a friction structure comprising the open edge of the magnetic structure together with an impregnated organic friction member 298, a shaft 300 and an end plate 302 in spatial relation and fastened to chassis 70 for holding the clutch parts in proper alignment. Power to coil 296 is provided through slip rings 304 and brushes 306; rings 304 being moulded on structure 294 separated therefrom by an insulation layer 294'.

Figure 22:
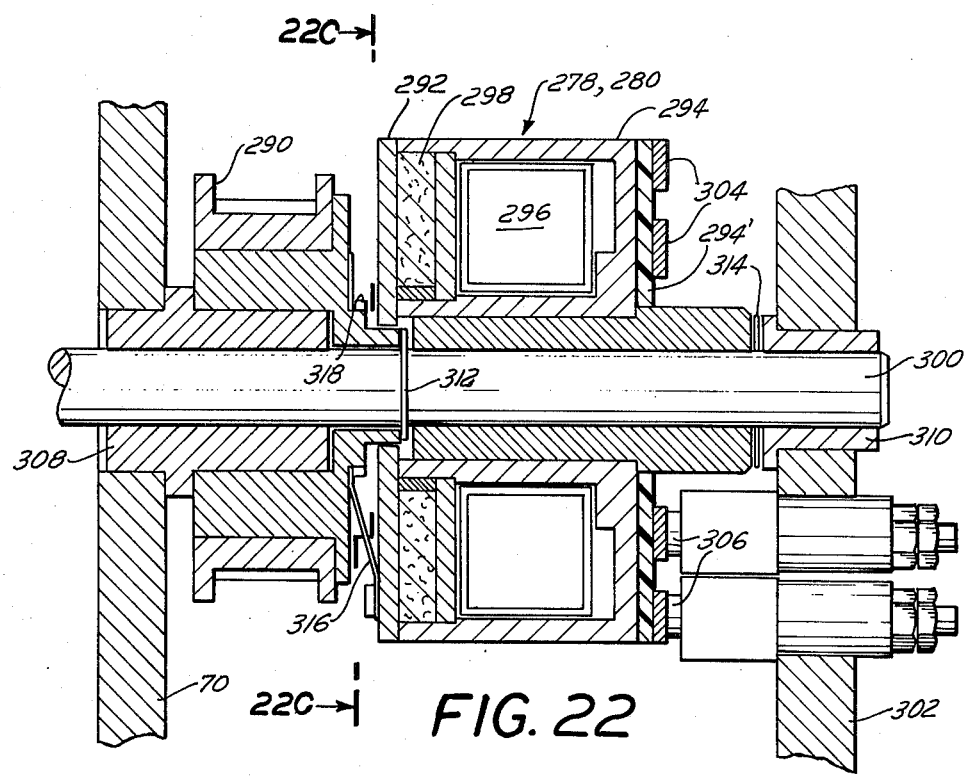
FIG. 22 is a detailed cross sectional view of the magnetic clutch in energized condition.
Figure 22A:
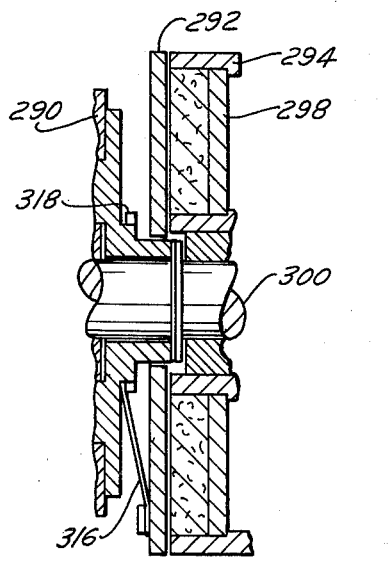
FIG. 22A is a portion of FIG. 22 with the clutch in unenergized condition.
Figure 22B:
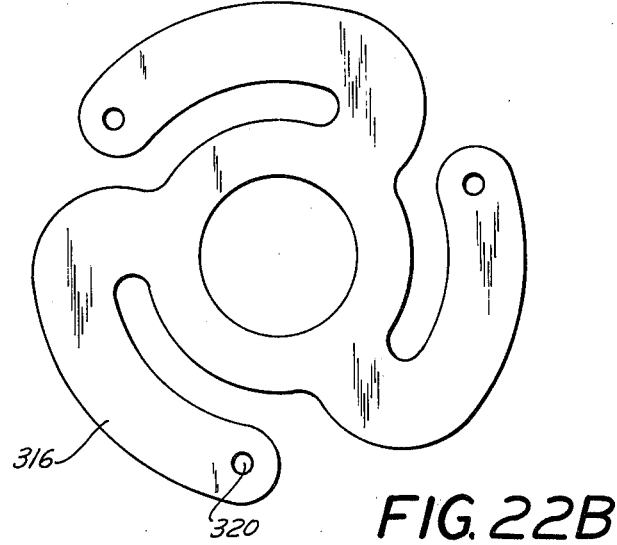
FIG. 22B is a plan view of the armature spring for the clutch.
Figure 22C:
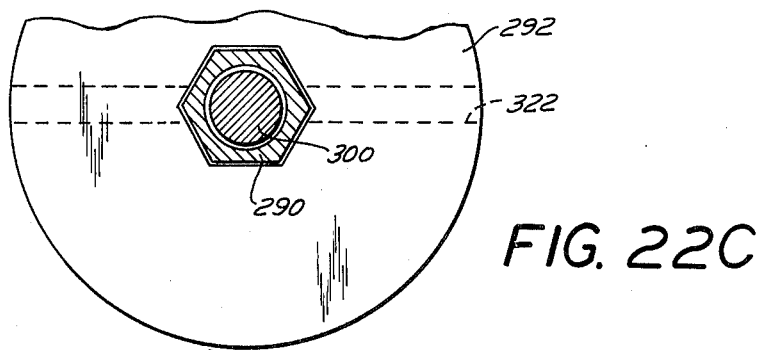
FIG. 22C is a detail view showing the coupling between the pulley drive and the armature.

Bearing member 308 fastened to chassis 70 acts as a bearing at its outer surface for pulley 290 and on its inner surface for shaft 300 which is carried at its outer end in bearing 310. Armature 292 floats on the narrowed end of pulley 290 in rotationally fixed but axially movable relationship as shown in FIG. 22C. When coil 296 is energized armature 292 is drawn against the ends of the reentrant cup-shaped magnetic structure 294 and also against friction member 298 which is preferably made from leather impregnated with silicone oil. The friction between the armature and the magnetic structure and friction member is generally proportional to the current flowing through the coil 296 and can be varied from a relatively low level for film take-up to a high level for rapid rewind and braking.

A groove ring 312 and a washer 314 retain the rotating parts in their proper axial position on shaft 300. A three-lobed spring 316 is held at its center in freely rotational relationship to the hub of pulley 290 by ring 318. The arms of the spring are attached to the armature at three points by rivets or screws passing through holes 320. The armature is provided with a diameter groove 322 for removing debris and excess silicone oil from the friction surfaces.

THE FILM SNUBBER

Referring to FIG. 9, a snubber 340 shows an arm 340A that is fixed to a shaft 340B spindled in a bushing and passing through the chassis wall to a retraction means and is attached at its far end to a potentiometer 438. Arm 340A has a film-guiding fence 340C and spindles a snubbing sprocket 340D. A coil spring 340E biases the snubber counter-clockwise to a stop 340F. Referring to FIG. 12, shaft 340B emerges and, on the driving side, is connected to a parallel linkage 342 through a crank 342A and a link 342B, to an arm 342C. Take-up reel arm 44 carries with it a bushing in which a pin 44A is fixed so that folding of the arm causes the pin to contact arm 342C and thereby turn snubber 340 from the position shown in FIGS. 9 and 2 to the position where it is inside the boundary of the folded or packaged projector shown in FIG. 1.

Figures 13, 14:
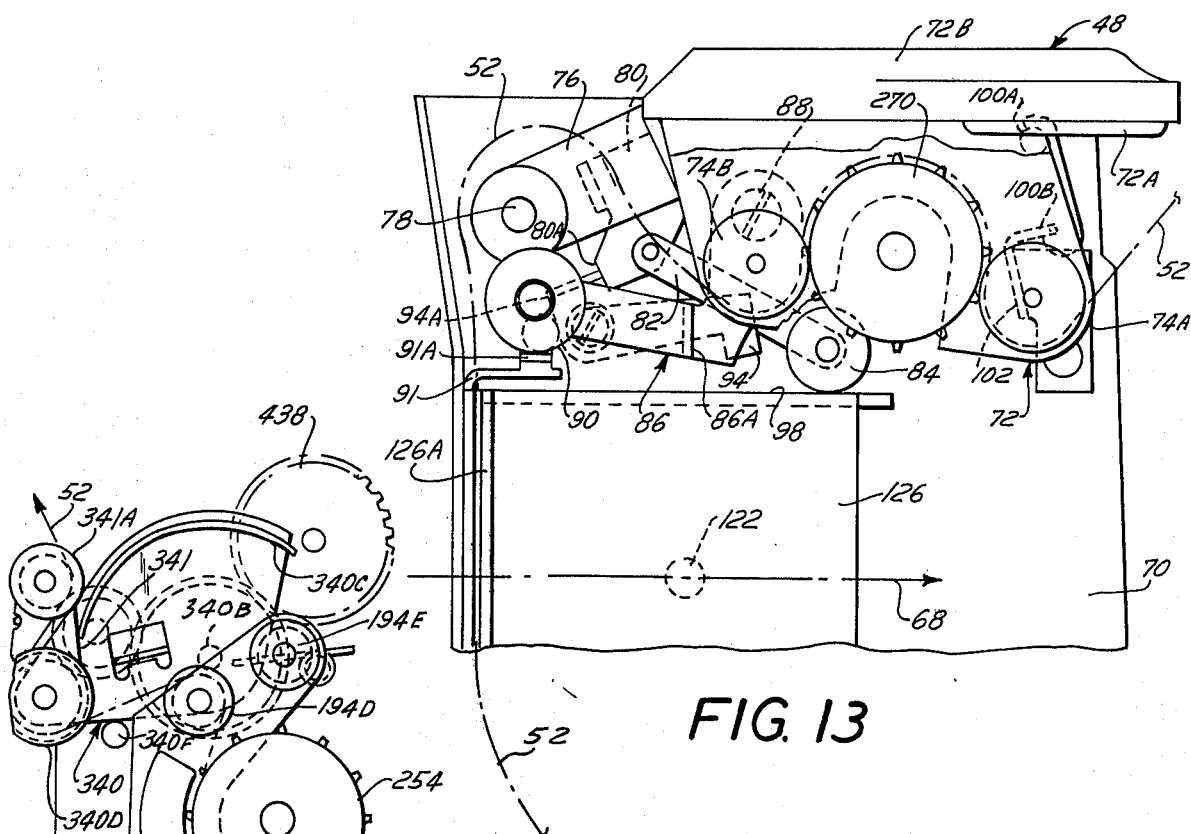
FIG. 13 is an operating-side view of the upper front portion of the projector in the operating mode.
FIG. 14 is an operating-side view of the rear portion of the projector in the operating mode.

Details of the snubber are shown in FIGS. 14, 24 and 24A. Arm 340A carries a rotatable arm 341 on which is moved a wrap-around roller 341A urged in clockwise position in FIG. 14 (counter-clockwise in FIG. 24A) by a spring 341B. Roller 341A not only insures that the perforations in the film will always be engaged on sprocket 340D but provides additional snubbing as well. The shaft of sprocket 340D carries at its rear end a gear 340G. Gear 340G engages a first idler gear 343 carried on the rear of arm 340A which has been omitted in FIG. 24A for clarity, a second idler gear 343A which rotates freely about shaft 340B and a driven gear 343B. Gear 343B rotates shaft 343C which drives a flexible wire cable 344 which in turn attaches to and drives digital footage counter 33. The ratio of gears 340G and 343B are chosen to make the counts shown on counter 33 correctly in feet. When film tension becomes excessive, arm 340A rotates against spring 340E, also rotating the shaft of potentiometer 438 which reduces the driving force at take-up clutch 278 in accordance with the action of the circuitry shown in FIG. 32.

THE AUTOMATIC UPPER LOOP MECHANISM

Figure 5:
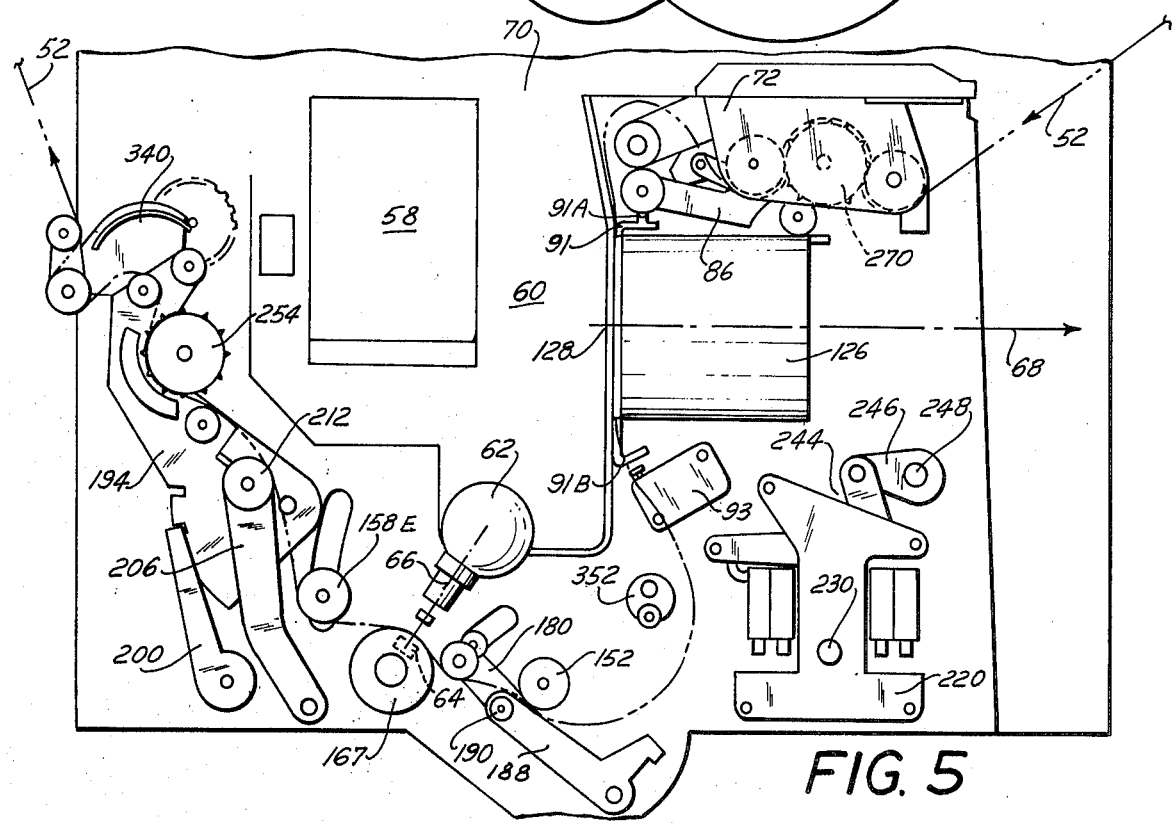
FIG. 5 is a view similar to FIG. 3, except that the projector is in the operating mode.
Figure 32:
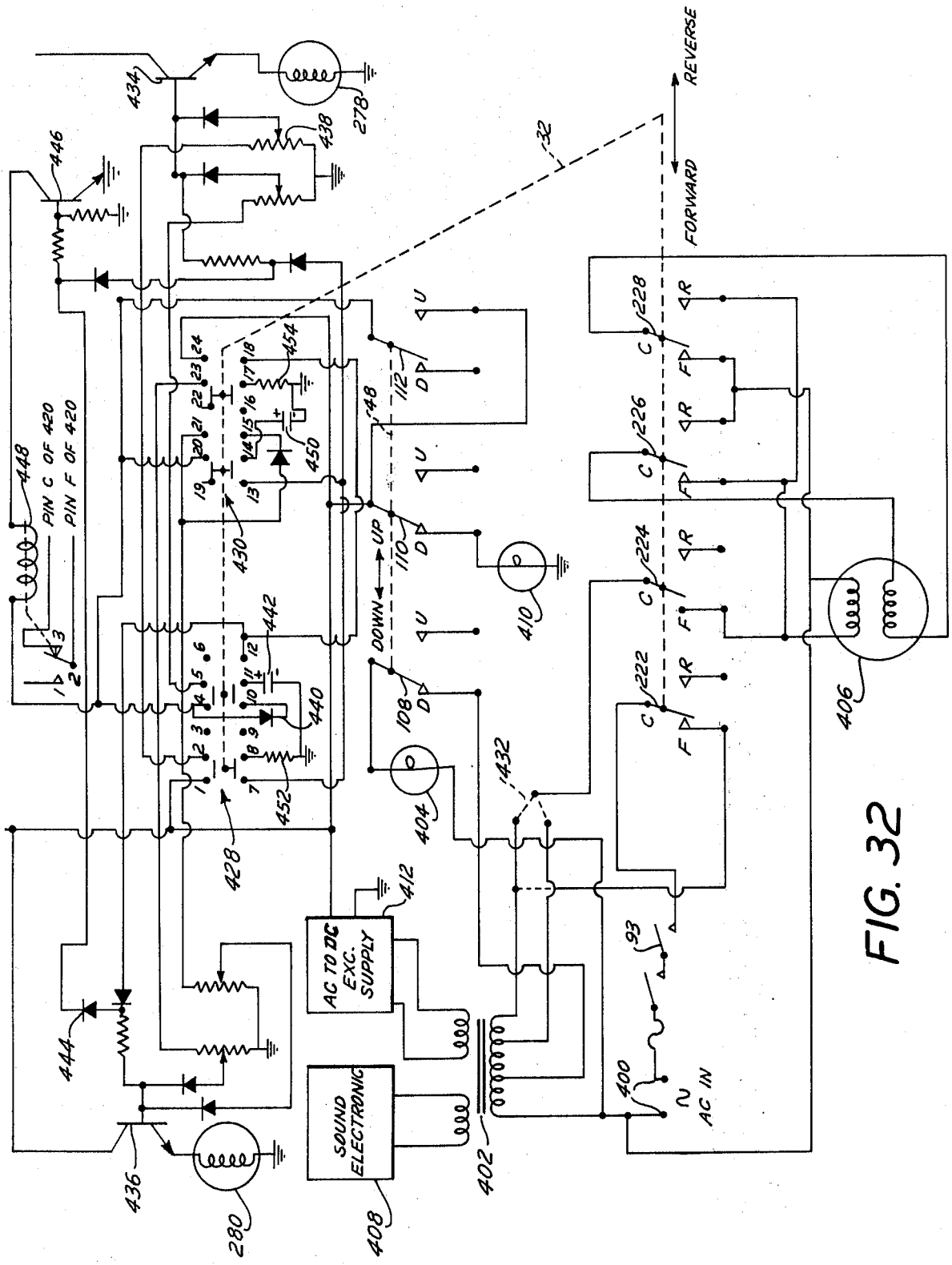
FIG. 32 is a circuit schematic of the projector.

Referring to FIGS. 5 and 6 in particular, the action of loop-loss arm 91 referred to earlier is now described. As shown in FIG. 6 looping film roller 90 is in raised position when gate lever 48 is up, thereby forming the loop. When lever 48 is closed as in FIG. 5 roller 90 drops to a neutral or passive position where it rests on upper portion 91A of loop loss arm 91. The friction between arm 91 and its guide prevents the arm and roller 90 from moving further down during normal operation. In the event the upper loop is lost, the film bears down on roller 90 and arm 91 causing the lower end 91B of the latter to press on the actuating button of micro-switch 93 which opens the main circuit to the projector as shown in FIG. 32. To reclose switch 93 for resumption of projection the operating control handle 32 is rotated from either its forward or reverse setting to "off" setting. This action causes lever arm 236 to lift thereby resulting in raising lower end 91B of arm 91 and permitting switch 93 to open. Lifting and reclosing lever 48 reforms the loop.

THE AUTOMATIC LOWER LOOPING MECHANISM

Referring to FIGS. 4, 6, and 11 in general, and to FIGS. 29 and 30 in particular, the mechanism associated with segmented and toothed pulley 282 is fixed to a shaft 350 spindled on a bearing and passing through the chassis wall to an arm drive 352 spindling a roller 354 (FIG. 6). Film 52, as originally loaded and running normally is in the position shown in FIG. 6. Also, arm 352 is in the position shown in the same figure and, correspondingly, pulley 282 is in the position of FIGS. 4 and 11 wherein FIG. 4 shows belt 272 running close to, but clear of, the segment face of the pulley. Should the film loop tighten, roller 354 is contacted. Arm drive 352 moves from position A to B, FIG. 29, and the first tooth of the gear is caught up by the moving belt, FIG. 30. When roller 354 passes position C, the loop has been restored. The roller continues until the gear loses its drive thus leaving the looping mechanism in the neutral position.

THE FILM MAGAZINE

Increased convenience in the use of the projector can be achieved through use of the magazine shown in FIGS. 31, 31A and 31B, which can have different length capacities, for example, 400 to 1600 ft. for 16 mm projectors. In use, the magazine is attached to the two reel arms after the latter have been released from their latched position and moved together to make the spindle spacing match the distance between the reel centers of the magazine. The preloaded film magazine 360 comprises a body or frame portion consisting of two generally flat panel members 362 and 364 of light metal or plastic spaced apart by studs or washers 366 and fastened together with screws, snaps, latches or other suitable means. The space between the panel members accepts a feed reel 368 which may be an ordinary film reel of from 400 to 1000 ft. or greater capacity and a take-up hub 370. The film 372, shown as 16 mm here but which may be of any gauge, is then threaded from the feed reel to the take-up hub. The spacing between the centers of the reel and the hub is kept at a minimum by permitting the increasing diameter of the hub, as it acquires film from the reel, to encroach into the reel diameter.

Associated with reel 368 are a pair of hub members, a rear hub 374 and a front hub 376. These can either be attached to the reel by cementing or can be captive within the panel members by means of flanges 378. In the latter case the flanges would be in driving relation to the reel via a pin such as 380 shown on the rear flange engaging a hole in the reel. Front flange 376 carries a pair of knobs or other protuberances 382 to allow convenient manual manipulation of the reel. When used with 16 mm projectors the rear flange carries the standard round hole 386 for accepting the spindle. The rear panel carries a pair of arcuate canopy members 388 which fit over the reel arms and positions the magazine for proper location between the reel arms.

The take-up hub is preferably made of plastic except for the drive plate 390 which is made of metal and carries a square hole similar to 380. Plate 390 is fastened to hub 370 by cementing or riveting. Hub 370 carries at its front end a round hole similar to that in front flange 376 and is also provided with knobs 382. The panel members carry on their inner surfaces raised radial ribs 392 which serve to reduce friction between the edge of the film and the panels and additionally serve as guides to insure mating of the edges of the enlarging roll of film on the hub into the edges of the reel flange. A pair of rollers 396 prevent scratching of the film when the loop is engaged by the projector.

In use the magazine is fitted over the reel arms with the reel spindles engaging the holes in the flange and hub. The loop of film is then pulled from the bottom of the magazine and dropped into the threading slot of the projector. Forward and reverse operations are identical to that of the conventional two reel system.

The magazine can also be employed without use of a film reel by using a hub 370 in place of the reel. The open sides and top of the magazine may be covered with a separate strip if desired or one of the cover members may carry an inwardly projecting flange around three edges.

CIRCUIT SCHEMATIC OF THE PROJECTOR

Referring to FIG. 32, the schematic wiring diagram shows lever 48 in its down position and control handle 32 in the "Forward" position.

Power is supplied from an alternating current source via terminals 400 to the primary of a transformer 402. The secondary of the transformer supplies power at appropriate voltages to a projection lamp 404, to a motor 406 and to the sound electronics 408 which includes a conventional rectifier, a photoelectric cell, amplifier and speaker. The transformer also provides power to an exciter lamp 410 and to electronic components in the control circuit through an AC to DC power supply unit 412.

With gate lever 48 in its down position switches 108, 110 and 112 are in their "D" positions are have closed the circuits to the projection lamp 404 and the exciter lamp 410.

Switches 222, 224, 226, 228, 428 and 430 are connected to control lever 32. Switch 432 is a selector for 230 volt or 120 volt motor operation. In the forward direction power is provided to motor 406 through contact F of switch 222 through switch 432 and contact F of switch 224. Switches 226 and 228 are reversing field switches which reverse the direction of the motor when their contacts are in the R position through action of control handle 32. When the control lever is in either off position or reverse, the connections in switch 428 become 2 to 3, 5 to 6, 8 to 9 and 11 to 12, while in switch 430 they become 14 to 15, 17 to 18, 20 to 21 and 23 to 24.

When control handle 32 is in the forward position transistor 434 will conduct power to magnetic clutch 278 driving the spindle at take-up reel arm 44 at a given torque while transistor 436 will be cut off and hence no power will flow to clutch 280 at the supply arm 42. If desired, however, a low voltage may be applied to transistor 432 during forward operation to provide additional drag on the feed spindle. The degree of torque applied by clutch 27 to the spindle at the take-up arm is controlled through voltage from pin 1 of switch 428 via pin 2 through adjustable potentiometer 438 to transistor 434. Although this potentiometer could be preset if desired, it is preferred to have it respond to the amount of tension at the take-up spindle which will vary considerably with the amount of film on the reel. Hence, potentiometer 438 is connected through gears to the arm of snubber 340A such that when there is little film on the take-up reel the attendant high tension raises the arm, rotating the shaft of the potentiometer and reducing power to the clutch and hence reducing the tension. As the film accumulates on the reel the reverse takes place and the increased voltage at the clutch restores the tension to the proper level.

When the gate lever is opened for fast forward operation, switches 108, 110 and 112 move so that they are contacting the pins U with the result that the projection lamp and the exciter lamp are turned off and pin U of switch 112 applies a voltage pin 4 of switch 428. The flow of current through diode 440 and through pins 10 and 11 of switch 428 will charge capacitor 442 and via diode 444 causing transistor 446 to conduct, thus energizing relay 448. The discharge time of capacitor 442 determines how long relay 448 will stay energized. Hence, when control lever 32 is turned to its Off position, switch 222 opens the circuit to the motor, causing the projector mechanism to stop. The take-up spindle will also stop, since switch 420 will continue to conduct through pin 3 of relay 440 which is connected across switch 420 and lock the take-up spindle to the stopped mechanism for a brief period. This period is the time constant of the capacitor-relay combination and is preferably of the order of 3 to 5 seconds, thus allowing the film to come to a rapid braking stop.

When the control lever 32 is in reverse position, switch 430 and capacitor 442 provide the identical braking action in the opposite direction. Resistors 452 and 454 are incorporated in order to discharge by proper switching that capacitor which is not to be functioning and hence prevent both brakes from becoming activated simultaneously.

OPERATION OF THE PROJECTOR

I. Loading the Film (FIGS. 1 and 2)

A. Lever 48 is placed in its raised position and handle 32 in its Off position if not already in these positions.

B. Arms 42 and 44 are extended to their open positions, reels 52 and 56 mounted.

C. Film 52 is attached to take-up reel 56 and a length of film between the reels inserted into film slot 50.

D. Reel 56 is turned to take up film slack. This brings the film into contact with idler 74B, FIG. 6; upper looping roller 90, FIG. 5; lower automatic loop-restoring roller 354, FIG. 6; lower loop forming roller 152, FIG. 9; snubber roller 340D, FIG. 9.

II. Positioning the Film for Operation ("Threading")

Lever 48 is lowered to its latching stop position.
In this movement of 60° rotation the following actions occur;

A. In the first 30°:

1. Rollers 194C and 194D lock the film onto takeup sprocket 254. Referring to FIGS. 9, 10, 11, 12, 14 and 15, rotation of shaft 78 mounting lever 48 turns arm 108 which causes pin 120B to turn arm 130 and trip arm 140. This allows spring 172, FIG. 12, to pull up arm 148; and, through pin 148A bearing against opening 194H.

FIGS. 9 and 14 bring rollers 194C and 194D against sprocket 254. Damper rollers 212, kept clear for film loading by bracket 194G, now move into operative position against the film.

2. Lens barrel 126 and film pressure shoe 126A move in part-way. Referring to FIGS. 6 and 11, downward movement of slanted opening 120A came pin 122, and with it the barrel and plate from the position of FIG. 11 towards the position of FIG. 15.

3. The film, already in contact with roller 74B, FIG. 6, is not contacted by roller 74A and the film moves towards the position of FIG. 13.

4. Switches 108, 110 and 112 are moved to positions D as shown in FIG. 32 and apply power to both the projection lamp and the exciter lamp.

B. From 30° to 35°, FIGS. 9, 11, 14 and 15, arm 130 releases arm 142 so that spring 154 can move loop roller 152 out of the lower loop area. This in turn permits damper roller 190 to move into contact with the film.

C. From 35° to 40°, FIGS. 6, 13, arm 82 moves away from support of arm 86 so that upper loop roller 90 drops out of the loop area.

D. From 40° to 45°, film pressure shoe 126A is brought up to, but not into, the film drive claw.

E. In the remaining 15°, the film is seated on sprocket 270, FIG. 13, as the gap at pressure shoe 126A is closed.

During the movement of lever 48, pin 120C on link 120, FIGS. 11, 12, 14, 15, 16, 17 and 18, turns arm 138 bearing on pin 146A. Link 146 moves against restraint by spring 162, acting through cam follower 160, arm 158 and arm 156, and pin 146A drops into positive recess 136C. This links up the co-action between control handle 32, FIG. 7 with capstan rollers 186 and 158E. Roller 186 is moved close to capstan 167 so that the roller can respond to film tension through the biasing of spring 182, FIG. 9.

III. Operating in Forward Mode

Control handle 32 turned to Forward, does the following:

A. Referring to FIGS. 6, 25, 26 and 27, arm 234 through cam 240 B turns shaft 248. The linked movement from arm 250 drives roller 186 close up against capstan 167 and moves roller 158E down so that the film is in operating wrap on the capstan. The slight gap provided between roller 186 and the capstan in Stop position prevents a pull of the film at the claw by flywheel action that would result in film damage.

B. Switches 222, 224, 226, 228, 428 and 430 assume the positions shown in FIG. 32. Switches 222 and 224 energize drive motor 406 and switches 428 and 430 energize clutch 278 which results in rotation of the spindle at take-up arm 44.

IV. Operating in Reverse Mode

Control handle 32, turned to Reverse, does the following:

A. Referring to FIGS. 6, 25, 26 and 28, and to the movement of parts described above, rollers 186 and 158E are moved back so that film can move freely through the sound scanning area.

V. Rewinding the Film:

From the above-described operations, channel 50 is clear for the film to run through when lever 48 is raised. Referring to FIGS. 6 and 13, roller 84 lifts arm 86 at 86B until bond 94A can drop back by gravity.

Figure 15:
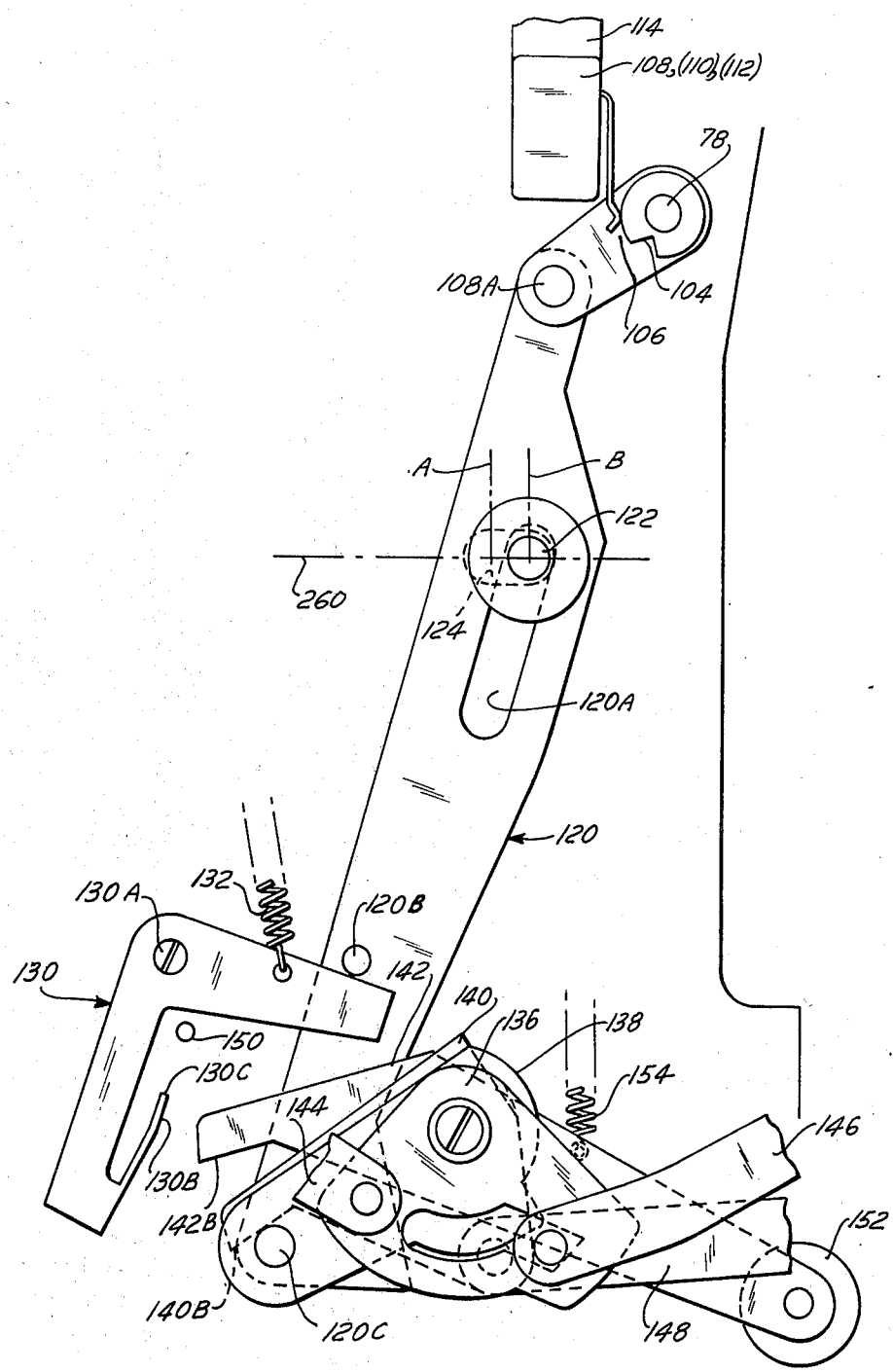
FIG. 15 is a driving-side view of the front portion of the projector in the operating mode.

Referring to FIGS. 11, 15 and 32 cam 104 opens switches 108 and 110, when lever 48 is opened thus cutting off power to the projector lamp and the exciter lamp. Switch 112 is simultaneously closed thereby activating clutch 280 with higher voltage so that it transmits maximum torque with substantially no slippage when the operating lever is turned to Reverse. When rapid wind is terminated by setting the operating lever to Off the circuit provides power to the clutch through relay 448 to insure it coming to a prompt stop.

Rapid forward operation from reel to reel is achieved in a similar manner with the role of the driving clutches reversed. To prevent damage to the film by inadvertent closing of lever 48 the cam surfaces shown in FIGS. 23 and 23A lock the lever in open position during projector operation.

Preferably, the film should be removed from channel 50 for complete rewind.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A self-threading motion picture projector comprising in combination, a loading slot for accepting filmstrip, a film gate, an upper sprocket, a lower sprocket, a magnetic-clutch-actuated drive for a supply reel, a magnetic-clutch-actuated drive for a take-up reel, an upper loop forming means, a lower loop forming means, a sound drum wrap means, a reversible drive train, and an improved control system comprising:
    a. a first control means having two positions, a first position permitting the film in the loading slot to clear the upper and lower sprockets, and a second position for actuating the upper and lower loop forming means and for engaging the film to the upper and lower sprockets and
    b. a second control means having three positions, a first position for actuating the drum wrap means, energizing the drive train in the forward direction, and energizing the magnetic clutch of the take-up reel drive; a second position for releasing the sound drum wrap means, energizing the drive train in the reverse direction, and energizing the magnetic clutch of the supply reel drive; and a third position for de-energizing the drive train and energizing for a timed brief period one of the magnetic clutches with a braking voltage.

2. The self-threading projector according to claim 1, said first control means being interlocked with said second control means to prevent said first control means from being moved from its second position to its first position when said second control means is in either its first position or its second position.

3. The self-threading projector according to claim 1, including a capacitance-resistance circuit for timing the braking voltage period.

4. The self-threading projector according to claim 1, said second control means including circuit means for energizing temporarily the magnetic clutch of the supply reel to braking condition when the second control means is moved from its first position to its third position.

5. The self-threading projector according to claim 1, said second control means including circuit means for energizing temporarily the magnetic clutch of the take-up reel to braking condition when the second control means is moved from its second position to its third position.

6. The self-threading projector according to claim 1, said second control means being so programmed that movement from the first position to the second position or movement from the second position to the first position requires passing through the third position.

7. The self-threading projector according to claim 1, said first control means being interlocked with said second control means to prevent said first control means from being moved from its first position to its second position when said second control means is in either its first position or its second position.

8. The self-threading projector according to claim 1, including a snubber sprocket between said lower sprocket and said take-up reel for actuating a take-up tension control.

9. The self-threading projector according to claim 8, said take-up tension control comprising a potentiometer for regulating the torque of the magnetic clutch of the take-up reel.

10. The self-threading projector according to claim 1, including a metering snubber sprocket between said lower sprocket and said take-up reel driven by said filmstrip, said idling sprocket driving a footage counter.

11. The self-threading projector according to claim 10, said metering sprocket being carried on an arm and a rotatable shaft and driving said footage counter through a gear train which includes a gear turning freely on the rotatable shaft.

12. The self-threading projector according to claim 1, said upper loop forming means comprising a roller which assumes an upper position during loop forming, an intermediate position during normal operation and a lower position when the upper loop is lost, and cut-off means actuated by the roller in its lower position for opening a switch to de-energize the drive train.

13. The self-threading projector according to claim 12 including means operated by said second control means for restoring the cut-off means to its unactuated condition and for reclosing the switch when the second control means is moved from its first position or from its second position.

14. A self-threading motion picture projector comprising in combination: a loading slot for accepting filmstrip, a film gate, an upper sprocket, a lower sprocket, a magnetic-clutch-actuated drive for a supply reel, a magnetic-clutch-actuated drive for a take-up reel, an upper loop forming means, a lower loop forming means, a sound drum wrap means, a reversible drive train, and an improved control system comprising:
    a. a first control means having two positions, a first position permitting the film in the loading slot to clear the upper and lower sprockets, and a second position for actuating the upper and lower loop forming means and for engaging the film to the upper and lower sprockets, and
    b. a second control means having three positions, a first position for actuating the drum wrap means, energizing the drive train in the forward direction, and energizing the magnetic clutch of the take-up reel drive; a second position for releasing the sound drum wrap means, energizing the drive train in the reverse direction, and energizing the magnetic clutch of the supply reel drive; and a third position for de-energizing the drive train and energizing for a timed brief period one of the magnetic clutches with a braking voltage; and second control means when in its third position, deenergizing both magnetic clutches after a brief period, allowing the reel drives to be free of the stopped drive train.

* * * * *